United States Patent
Eberhardt et al.

(10) Patent No.: US 11,254,803 B2
(45) Date of Patent: Feb. 22, 2022

(54) ANTIMICROBIAL STORAGE OF WATER OR AQUEOUS SOLUTIONS ESPECIALLY IN MOTOR VEHICLES

(71) Applicant: KAUTEX TEXTRON GmbH & Co. KG, Bonn (DE)

(72) Inventors: Agnes Eberhardt, Bonn (DE); Timm Heidemeyer, Cologne (DE); Sammy Metsahel, Bonn (DE)

(73) Assignee: KAUTEX TEXTRON GmbH & Co. KG, Bonn (DE)

( * ) Notice: Subject to any disclaimer, the term of this patent is extended or adjusted under 35 U.S.C. 154(b) by 0 days.

(21) Appl. No.: 17/041,924

(22) PCT Filed: Jan. 25, 2019

(86) PCT No.: PCT/EP2019/051866
§ 371 (c)(1),
(2) Date: Dec. 15, 2020

(87) PCT Pub. No.: WO2019/185214
PCT Pub. Date: Oct. 3, 2019

(65) Prior Publication Data
US 2021/0108049 A1 Apr. 15, 2021

(30) Foreign Application Priority Data
Mar. 26, 2018 (DE) .......................... 102018107149.3

(51) Int. Cl.
*C08K 5/56* (2006.01)
*C08L 33/08* (2006.01)
*C08L 77/06* (2006.01)

(52) U.S. Cl.
CPC ................ *C08K 5/56* (2013.01); *C08L 33/08* (2013.01); *C08L 77/06* (2013.01)

(58) Field of Classification Search
CPC .. C08K 5/56; C09D 5/14; C08L 77/06; C08L 33/08
See application file for complete search history.

(56) References Cited

FOREIGN PATENT DOCUMENTS

| | | |
|---|---|---|
| CN | 101052304 A | 10/2007 |
| CN | 101084163 A | 12/2007 |
| CN | 102469795 A | 5/2012 |
| DE | 69420862 | 5/2000 |
| DE | 10105709 | 8/2002 |
| DE | 102007048107 | 6/2009 |
| DE | 102010051310 | 5/2012 |
| DE | 102017112130 | 12/2017 |
| EP | 2520336 A2 * | 11/2012 ............... A61K 8/37 |

(Continued)

OTHER PUBLICATIONS

English machine translation of EP 2520336 (Year: 2012).*

(Continued)

*Primary Examiner* — Angela C Scott
(74) *Attorney, Agent, or Firm* — Lee & Hayes, P.C.

(57) ABSTRACT

A service fluids container made of plastic for installation in a motor vehicle. The service fluids container is suitable for antimicrobial storage of service fluids even in the event that the motor vehicle is shut off for prolonged periods. The interior of the container accommodates an antimicrobial composition comprising a hydrophilic polymer and a complex compound of a metal salt with an organic ligand.

27 Claims, 10 Drawing Sheets

(56) References Cited

FOREIGN PATENT DOCUMENTS

Figure 1:
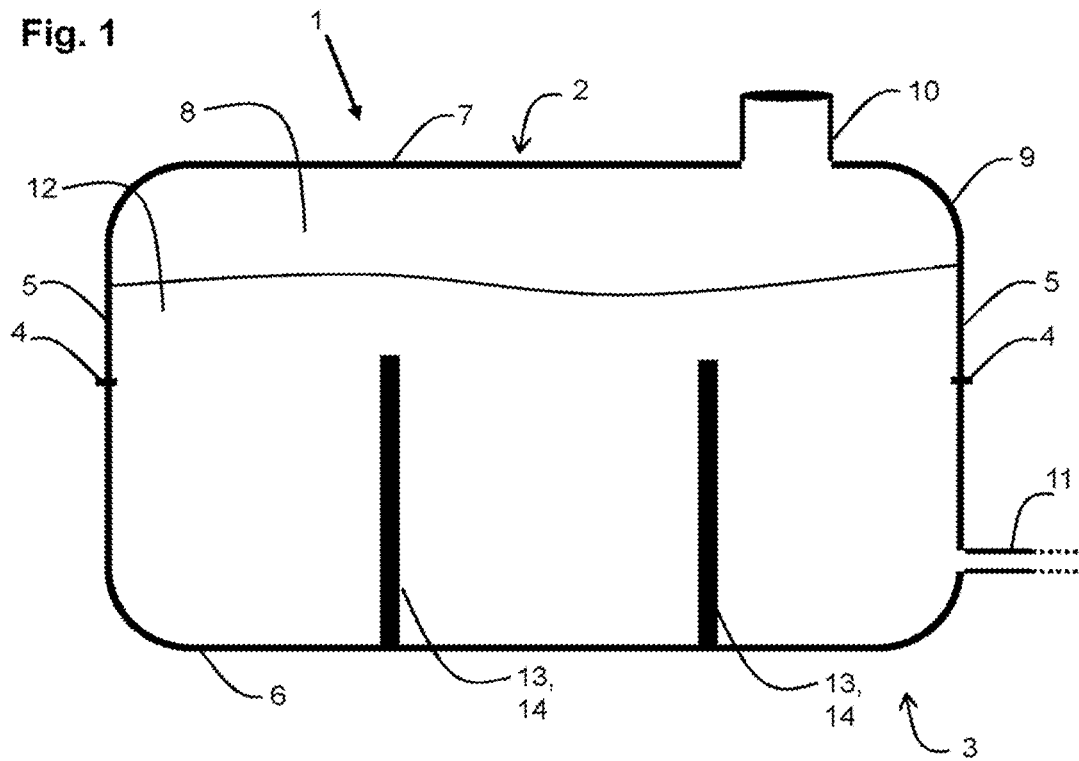

| | | |
|---|---|---|
| JP | H0912717 | 1/1997 |
| WO | WO2006101438 | 9/2006 |
| WO | WO2009041837 | 4/2009 |

OTHER PUBLICATIONS

PCT Search Report for corresponding PCT Application No. PCT/EP2019/051866 dated Apr. 8, 2019, 15 pages.
Chinese Office Action and English translation for corresponding Chinese Patent Application No. 201980032416.2 dated Mar. 15, 2021, 11 pages.
PCT International Preliminary Report on Patentability for corresponding PCT Application No. PCT/EP2019/051866 dated Oct. 1, 2020, 5 pages.

* cited by examiner

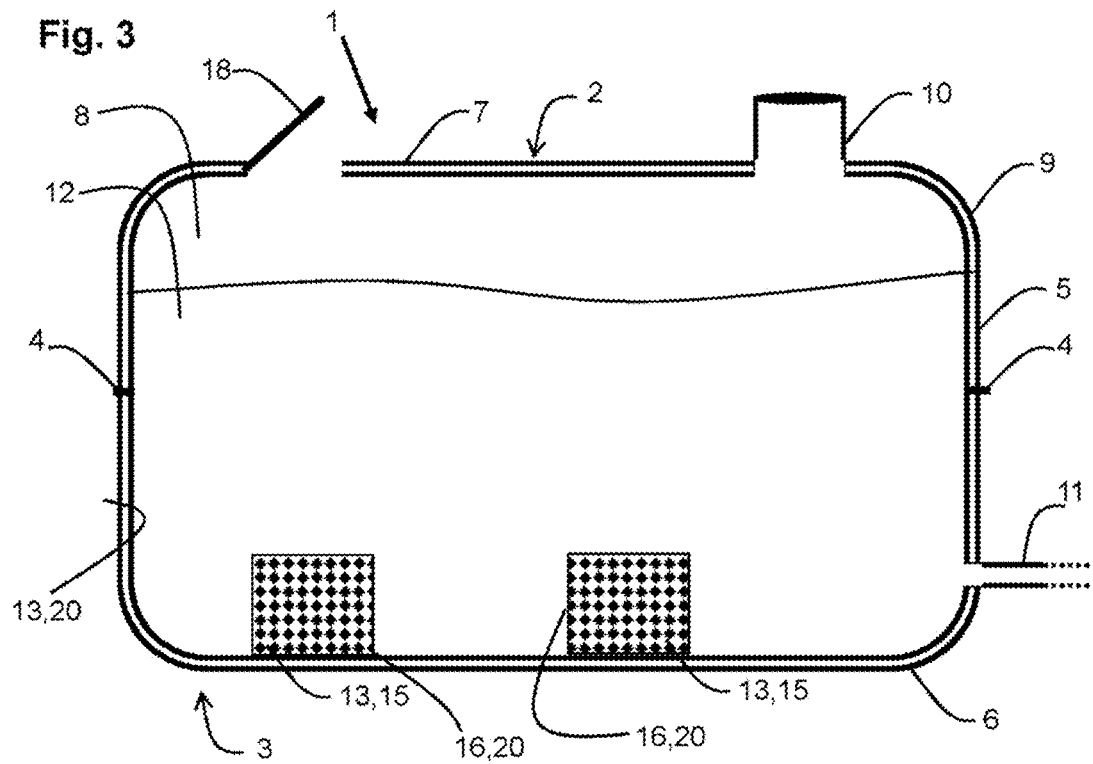

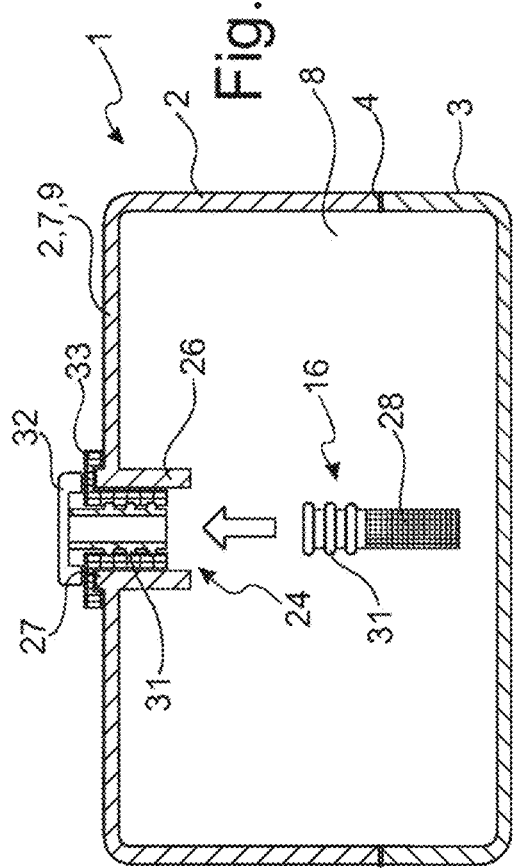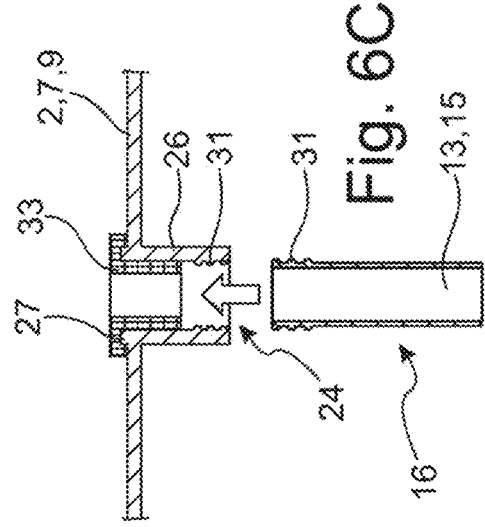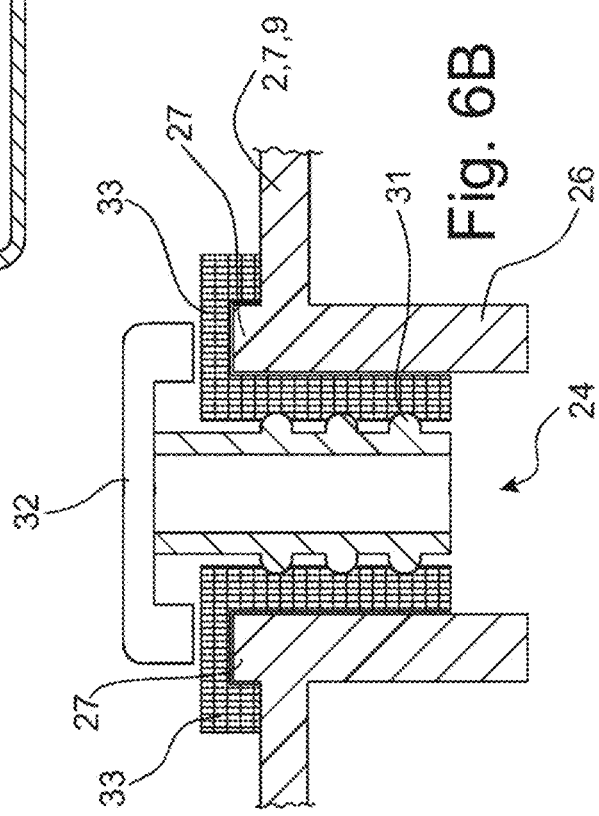

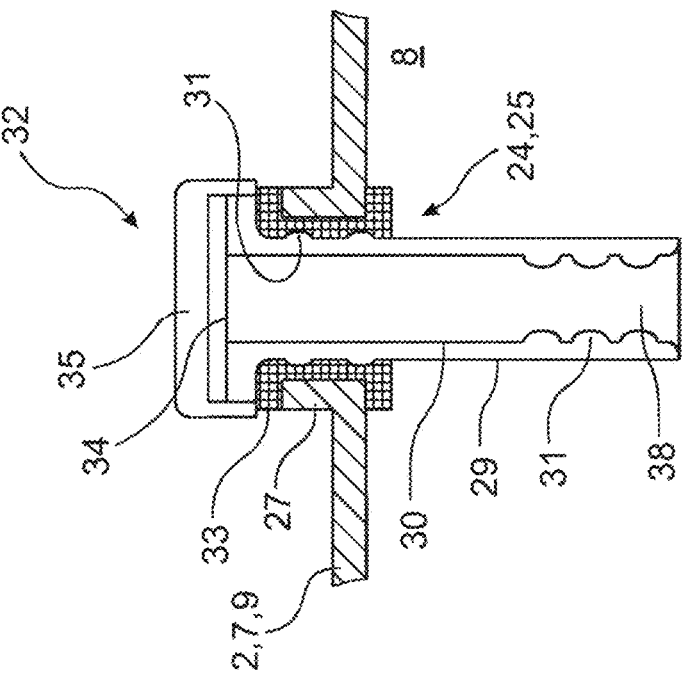
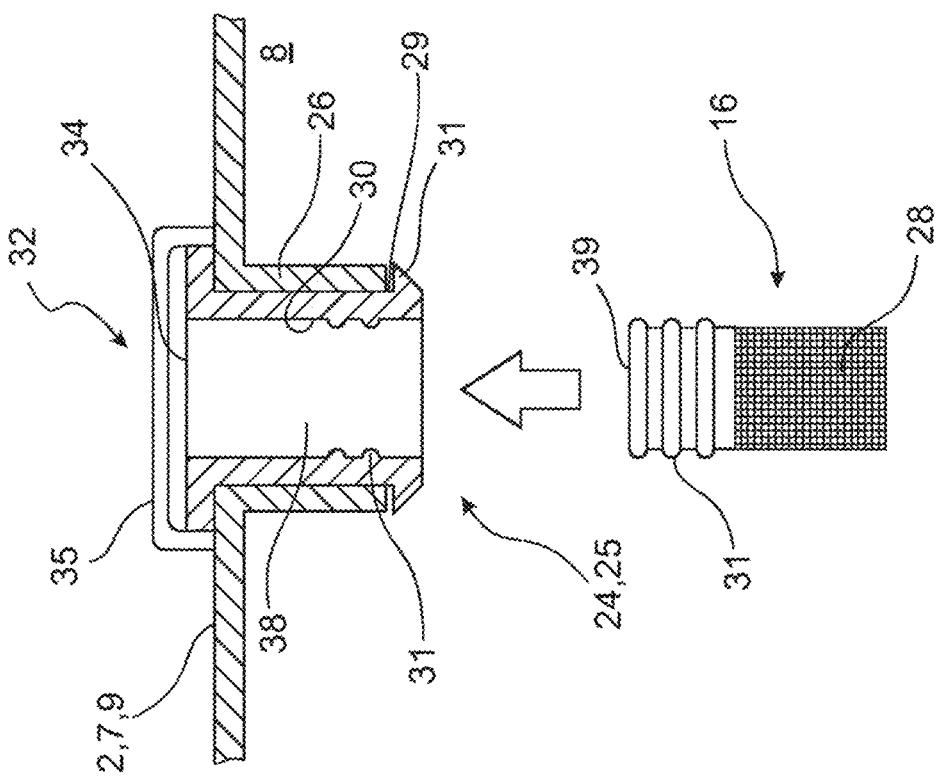

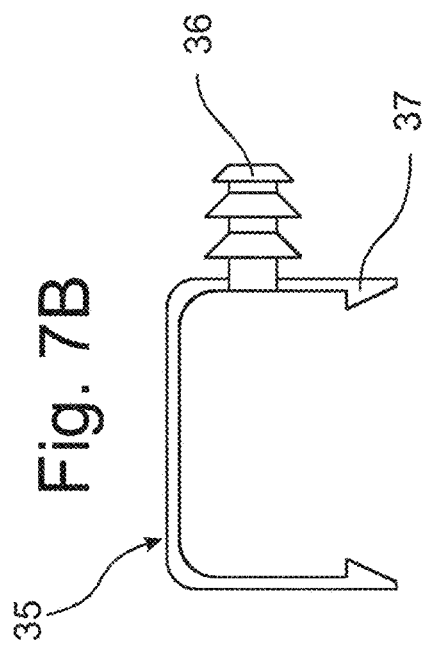
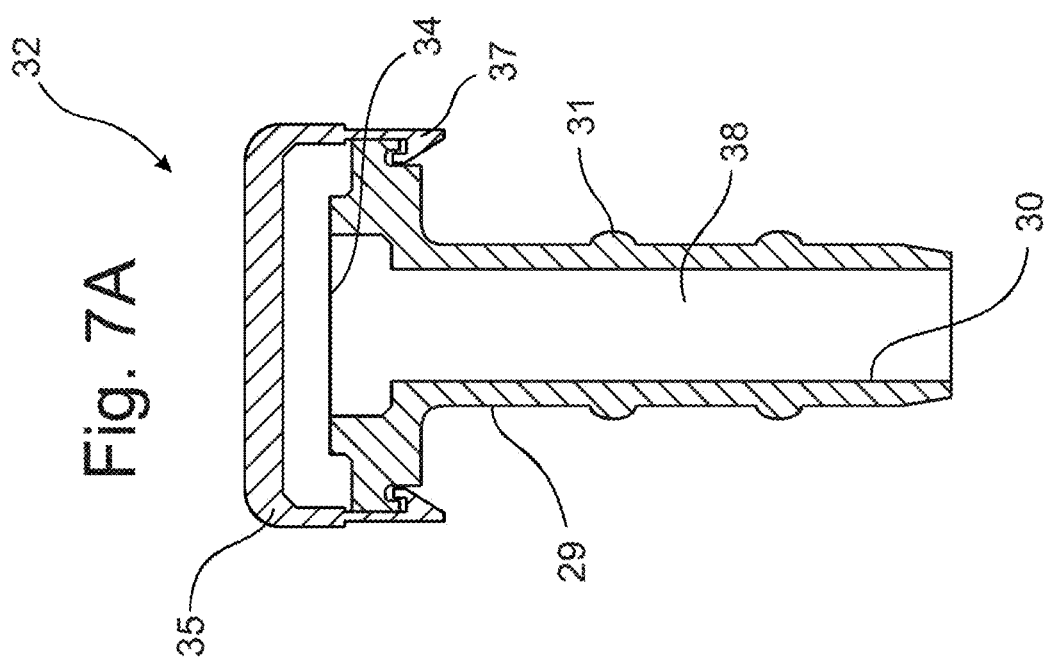

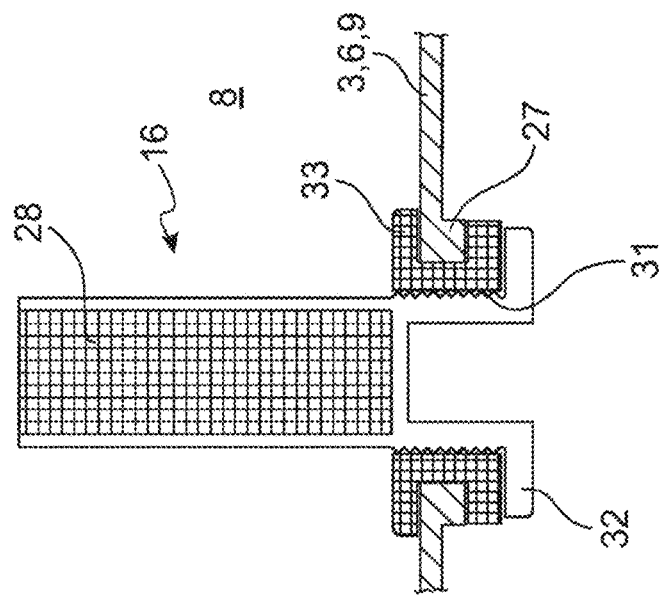
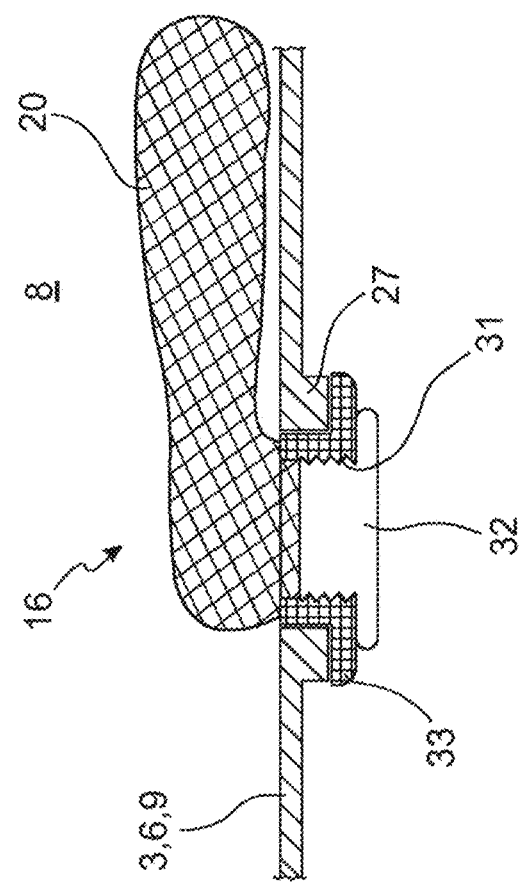

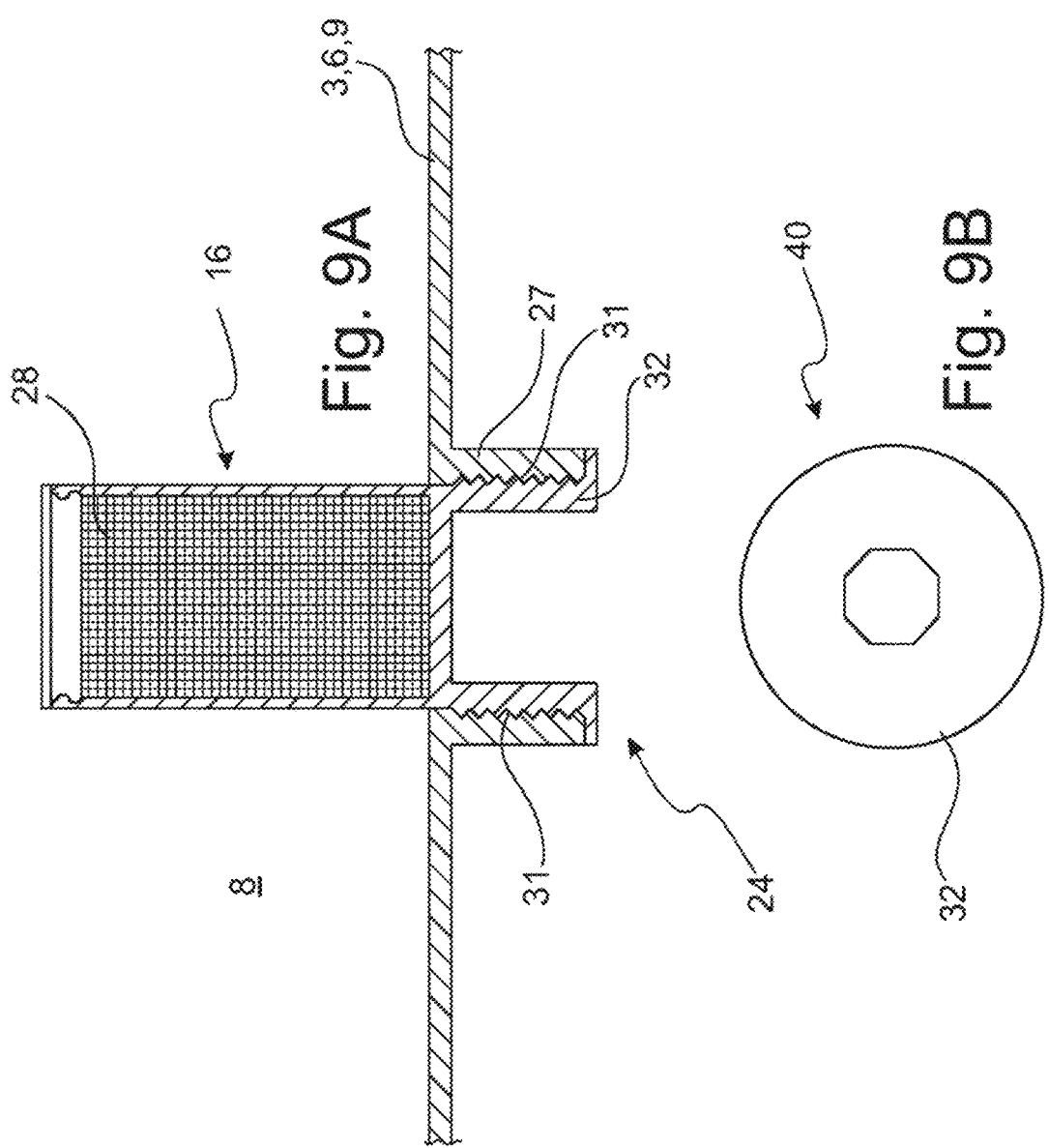

ANTIMICROBIAL STORAGE OF WATER OR AQUEOUS SOLUTIONS ESPECIALLY IN MOTOR VEHICLES

This Application claims priority to PCT Application No. PCT/EP2019/051866, filed Jan. 25, 2019, which claims priority to German Patent Application No. 10 2018 107 149.3, filed Mar. 26, 2018, the contents of each of which is incorporated herein by reference.

The present invention relates to a container for antimicrobial storage of water or aqueous solutions, in particular a container installed in a motor vehicle. Furthermore, the present invention also relates to a method for the antimicrobial treatment of water or aqueous solutions using the container according to the invention.

Water provides the habitat for a large number of organisms, in particular microorganisms. Accordingly, such organisms propagate over time even in closed containers even when highly pure water or aqueous solutions are stored, unless suitable countermeasures are taken.

The propagation of organisms can result in the fact that the water or the aqueous solution can no longer be used for its intended purpose. For example, water intended for consumption can become unusable for hygienic reasons.

In the field of motor vehicles, water or aqueous solutions are also frequently used, for example, as a service fluid for the water injection in internal combustion engines for reducing emissions and/or to improve performance or as a service fluid for cleaning windshields, headlights and/or sensors of a motor vehicle.

In the following, the term "(aqueous) service fluid," in particular for motor vehicles, shall be used to denote water or an aqueous solution solely for reasons of simplicity. However, a service fluid only represents one preferred embodiment of water or an aqueous solution.

Aqueous service fluids for motor vehicles are frequently stored in containers in order to be available for their intended use. For this purpose, the service fluid is sometimes stored for several months, which can result in the above-mentioned propagation of microorganisms in the service fluid. Such a propagation can be intensified particularly if the motor vehicle remains out of service for a prolonged period, for example during the summer, i.e., at higher temperatures.

The increase in the number of microorganisms in the service fluid can have an adverse effect on the proper operation of the motor vehicle. In particular, biofilms can form which can afflict and thus damage filters and dosing units of the motor vehicle, for example, or render same inoperative. In particular, an afflicted filter in a water injection system for internal combustion engines shall be named by way of example. As a result, the pump also present in the system can no longer perform as intended and the water injection system malfunctions.

From the prior art, a multiplicity of methods are already known which are used for an antimicrobial treatment of aqueous solutions and essentially fall into two categories, namely physical and chemical antimicrobial treatment. Examples of physical methods are the killing of microorganisms using UV light or thermal disinfection. Examples of chemical methods are the use of oxidative gases or metal ions (in particular silver ions).

However, the physical methods are disadvantageous because they require an energy supply which is problematic particularly in motor vehicles that are not operated for a longer period. The chemical methods are disadvantageous because the concentration of the added antimicrobial substance decreases over time and particularly when service fluid is removed and the container is refilled. Accordingly, the antimicrobial substances also have to be replenished in order to ensure a constant proper antimicrobial storage of the service fluid.

It would thus be desirable to be able to antimicrobially store the service fluid without an energy supply and without the need to refill an antimicrobially acting substance, possibly also over a longer period and despite refilling processes with the service fluid.

According to the invention, this problem is solved by a container and a method with the features disclosed in claim 1 and claim 15, respectively. Advantageous embodiments are described in the dependent claims.

The core of the present invention is that of providing a container, into the interior of which a composition is introduced which has an antimicrobial effect due to complex compounds of a metal salt with an organic ligand contained in said composition. In this case, the complex compounds are embedded in a matrix consisting of a hydrophilic polymer. Due to the hydrophilicity of the polymer, it swells when it makes contact with the water or the aqueous solution of the service fluid. As a result, the water molecules of the service fluid penetrate at least into the near-surface layers of the antimicrobial composition and wash out the metals located therein as metal ions along a concentration gradient into the surrounding service fluid, in which they subsequently deploy their antimicrobial effect.

Accordingly, an even and long-lasting release of metal ions into the service fluid is achieved by means of the antimicrobial composition according to the invention. In addition to this depot effect, the concentration of the antimicrobial metal ions in the service fluid can advantageously be determined by means of the concentration of the metal in the antimicrobial composition.

More specifically, the container according to the invention for antimicrobial storage of water or aqueous solutions has an antimicrobial composition arranged in the interior of the container, wherein the antimicrobial composition comprises a hydrophilic polymer and a complex compound of an antimicrobially acting metal salt with an organic ligand. In other words, a mixture containing a coordination compound of an organic ligand with a complexed, antimicrobially acting metal ion with a hydrophilic polymer is present.

The container can be any suitable container for the service fluid, i.e., for water or an aqueous solution, to be accommodated. Accordingly, the container can preferably be called a service fluids container. Particularly preferably, the container is a service fluids container for water, drinking water, water for the water injection in internal combustion engines, and aqueous cleaning solutions, in particular for the windshields, headlights and/or sensors of a motor vehicle.

Further preferably, the container is a hollow body which preferably is substantially closed. This means that in particular closeable openings as well as lines for filling or removing the service fluid can be provided on the container. Further closeable and preferred openings are openings through which installation parts can be introduced into or removed from the interior of the container. In addition, valves are also preferably present in the wall of the container, particularly preferably air-inlet and/or ventilation valves.

The container further has an interior which is defined and/or surrounded by the inner surface of the wall of the container. In general, the container has opposite sidewalls connected to one another by means of a container bottom or a container underside and a container top or a container upper side. The container bottom and the container top are also arranged opposite one another. Further preferably, the container can have two half-shells, an upper shell and a lower shell which, even more preferably, have been welded together. Preferably, the container is designed to be substantially cuboidal.

According to the invention, the antimicrobial composition is arranged within the interior of the container. For this purpose, it is preferred that the antimicrobial composition is a non-bearing element of the container. In other words, the antimicrobial composition is not essential for the (form) stability of the container. Further preferably, the interior of the container has a volume of 10,000 cm$^3$.

The container can be a plastic container, wherein it preferably comprises HDPE and/or polypropylene as the plastic and more preferably consists of HDPE and/or polypropylene. A very particularly preferred plastic is Lupolen, in particular Lupolen GX5038. Further preferably, the plastic container was produced using the injection molding process, the blow molding process, or the extrusion blow molding process. In such case, the plastic container can be easily adapted to the specific shape requirements of a motor vehicle in an advantageous manner. This applies particularly to a very particularly preferred injection-molded container.

The container further preferably has a single-layer wall.

The container is suitable for accommodating water or an aqueous solution. The water is preferably water for the water injection in internal combustion engines, tap water, drinking water, deionized water, or distilled water, wherein deionized or distilled water are particularly preferred. Particularly preferred aqueous solutions are aqueous cleaning solutions, particularly those for cleaning windshields, headlights and/or sensors of a motor vehicle. In a further preferred embodiment, the container according to the invention contains water or an aqueous solution.

The container is further suitable for the antimicrobial storage of water or aqueous solutions. In the context of the invention, the term "antimicrobial storage" means that the increase in the number of microorganisms contained in the service liquid is reduced or preferably prevented. Further preferably, the term "antimicrobial storage" means that the number of microorganisms contained in the service liquid is reduced. More preferably, the term "antimicrobial storage" means that a reduction in the number of microorganisms contained in the service liquid by at least 50%, more preferably by at least 70%, more preferably by at least 90% or at least 98%, and most preferably by 100%, is achieved. In the case of a reduction in the number of microorganisms contained in the service liquid by at least 98%, the service liquid can be referred to as a service liquid that is substantially free of microorganisms.

Further preferably, the reduction in the number of microorganisms contained in the service liquid occurs after an incubation period. This incubation period depends, among other things, on the number of microorganisms contained in the service liquid and the quantity of the metal ions introduced into the container or the concentration of the metal ions in the service liquid present when the service liquid is incubated with the antimicrobial composition according to the invention.

The incubation duration is preferably ≥1 day, ≥4 days, ≥6 days, ≥8 days, ≥10 days, ≥14 days, ≥20 days, or ≥22 days.

The microorganisms can be any microorganisms known to a person skilled in the art which have a susceptibility to the metal ions used according to the invention. Preferably, they are monocellular or multicellular microorganisms. Further preferably, the microorganism is an alga, a fungus, or, particularly preferably, a bacterium. Even further preferably, the bacterium is a gram-negative bacterium. Advantageously, such bacteria show greater susceptibility to the metal ions used according to the invention.

The antimicrobial composition comprises a hydrophilic polymer and a complex compound of a metal salt with an organic ligand. The metal salt and/or the metal ion of the metal salt is an antimicrobially acting metal salt and/or metal ion. The antimicrobial composition can substantially consist of only these two components, and have, for example, an overall proportion of ≥80 wt. %, ≥90 wt. %, ≥98 wt. %, or ≥99 wt. % of the mixture of the hydrophilic polymer with the complex compound. The antimicrobial composition can preferably contain further common additives, fillers, processing aids, color pigments, or lubricants.

The hydrophilic polymer can be any suitable polymer that swells when contacting water. The polymer can be a natural polymer, a modified natural polymer, or an artificial polymer. Within the context of the invention, an artificial hydrophilic polymer is particularly preferred.

Examples of preferred natural polymers are gelatins, galactose polymers and, particularly preferably, agar.

Preferred artificial polymers are thermoplastics and/or polymers based on carboxylic acid ester, more preferably based on acrylic acid ester, amino acid ester, benzene carboxylic acid ester, butyric acid ester, carbamate, dicarboxylic acid ester, acetic acid ester, hydroxycarboxylic acid ester (in particular alpha or beta hydroxycarboxylic acid ester), or lactone. Particularly preferably, the hydrophilic polymer is an acrylate and/or a polyamide, more preferably a polyamide. Advantageously, polyamides are capable of absorbing particularly large quantities of water (up to 3.7%).

Further preferably, the polymer can be a copolymer or a block copolymer.

The polyamide can be any suitable polyamide. Particularly preferably, the polyamide is selected from the group consisting of polyamide 6, polyamide 6.6, polyamide 6.10, polyamide 6.12, polyamide 11, polyamide 12, and mixtures thereof. The polyamide can further preferably be a copolyamide, a block copolyamide, or a polyamide blend. Copolyamide 6/66, available, for example, under the trade name Ultramid C33; BASF, is very particularly preferred because it has a low melting point and excellent processing properties.

The hydrophilic polymer is preferably a dendritic polymer which can also be called a hyperbranched polymer. Further preferably, the hyperbranched polymer is a dendrimer.

The organic ligand can be any suitable organic ligand which allows for a complexation of the metal ion of the metal salt. Preferably, the organic ligand is a complex-forming polymer.

Further preferably, the organic ligand is a branched or hyperbranched polymer or complex-forming polymer. It is also preferably a dendritic polymer or complex-forming polymer.

Further preferably, the organic ligand chelates the metal ion according to the invention. In other words, the metal ion according to the invention is the central particle of the formed complex.

The organic ligand can be any compound from organic chemistry which is capable of forming a complex with the metal ion according to the invention. The organic ligand is preferably based on a carboxylic acid or on ethyleneimine. In other words, the organic ligand is preferably a derivative of a carboxylic acid or the polymerization product of an ethyleneimine, i.e., a polyethyleneimine. The polyethyleneimine further preferably has ≥6 and ≤1000 monomer units, more preferably, it is a high molecular weight polyethyleneimine. The organic ligand is preferably also a polyester polyol. A particularly preferred polyethyleneimine is LUPASOL, available from BASF. A particularly preferred polyester polyol is Bolthorn H40.

If the organic ligand is based on a carboxylic acid, the organic ligand according to the invention is preferably a 2-oxazoline derivative of an organic carboxylic acid, preferably an aliphatic monocarboxylic acid, more preferably an aromatic dicarboxylic acid.

If the organic ligand according to the invention is a polyethyleneimine or a polyester polyol, the polyethyleneimine or the polyester polyol is further preferably an amphiphilically modified polyethyleneimine or polyester polyol. More preferably, the amphiphilically modified polyethyleneimine or polyester polyol has been amphiphilically modified with an n-alkane carboxylic acid. The n-alkane carboxylic acid used to amphiphilically modify the polyethyleneimine or the polyester polyol is further preferably a C8 to C22 n-alkane carboxylic acid, more preferably a C8, C16, or C22 n-alkane carboxylic acid. The most preferred n-alkane carboxylic acids are n-octanoic acid, n-hexadecanoic acid, and n-docosanoic acid. The amphiphilic modification preferably takes place by amidation of polyethyleneimine or the esterification of polyester polyol using n-alkane carboxylic acids and as described, for example, in C. Aymonier, U. Schlotterbeck, L. Antonietti, P. Zacharias, R. Thomann, J. C. Tiller, S. Mecking, Chem. Commun. 2002, 301, or EP 1557441 A2.

2-oxazolines are also called 4,5-dihydroooxazoles. They are heterocyclic 5-membered ring compounds which each contain one oxygen atom, one nitrogen atom and a double bond in the ring. The 2-oxazolines particularly preferred according to the invention contain the heteroatoms oxygen in the 1-position, the nitrogen in the 3-position, and the double bond in the heterocyclic ring is located between the carbon atom 2 and the nitrogen atom. 2-oxazolines can be obtained during the dehydration of N-(2-hydroxyalkyl) amides by intermolecular cyclization. Alternatively, β-halogen alkylamides can be reacted with strong bases, such as alcoholic alkalis. They can also be obtained by condensation reactions of 1,2-aminoalcohols with carboxylic acid esters, carboxylic acid amides, or nitriles. According to the invention, 2-oxazolines as derivatives of organic carboxylic acids are particularly preferred.

The organic carboxylic acid can be any suitable organic carboxylic acid. Preferably, the organic carboxylic acid is of an aliphatic, aromatic, or aliphatic-aromatic nature. Further preferably, the organic carboxylic acid is monofunctional, difunctional, or polyfunctional (preferably trifunctional) with regard to the number of carboxylic acid groups present. Particularly preferably, the organic carboxylic acid is selected from the group consisting of palmitic acid [CAS 57-10-3], stearic acid [CAS 57-11-4], behenic acid [CAS 112-85-6], 10-undecanoic acid [CAS 112-38-9], linolenic acid [CAS 463-40-1], oleic acid [CAS 112-80-1], erucic acid [CAS 112-86-7], oxalic acid [CAS 144-62-7], adipic acid [CAS 124-04-9], isophthalic acid [CAS 121-91-5], terephthalic acid [CAS 100-21-0], 2-bromoterephthalic acid [CAS 586-35-6], and trimesic acid [CAS 55-95-0].

The organic ligand is preferably a 2-oxazoline derivative of an organic carboxylic acid and selected from the group consisting of palmitic acid-2-oxazoline, stearic acid-2-oxazoline, 10-undecanoic acid-2-oxazoline, behenic acid-2-oxazoline, erucic acid-2-oxazoline, linolenic acid-2-oxazoline, oleic acid-2-oxazoline, oxalic acid-2,2'-bis(2-oxazoline), isophthalic acid-1,3-bis(2-oxazoline), terephthalic acid-1,4-bis(2-oxazoline), adipic acid-1,6-bis (2-oxazoline), trimesic acid-tris-(2-oxazoline), 1,3-phenyl-bis-(2-oxazoline), 1,4-phenyl-bis-(2-oxazoline), and 2,2'-Bis-(2-oxazoline). Particularly preferably, the organic ligand is selected from the group consisting of stearic acid-2-oxazoline, behenic acid-2-oxazoline, 1,3-phenyl-bis-(2-oxazoline), 1,4-phenyl-bis-(2-oxazoline), and 2,2'-Bis-(2-oxazoline).

The metal salt can be any suitable metal salt. Its metal ion preferably forms a complex compound with the organic ligand and has an antimicrobial effect. Further preferably, the metal according to the invention or the metal ion of the metal salt is a transition metal. More preferably, the metal ion is a cation. Even more preferably, the metal or the metal ion is selected from the group consisting of Ag, Co, Cu, Mn, Mo, Os, Sn, Ti, and Zn, more preferably Ag, Cu, Os, Mo, and Zn. Most preferably, the metal is silver (Ag) or the metal ion is a silver cation ($Ag^+$). The most preferred metal salt is $AgNO_3$.

For illustrating the complex compound of a metal salt with an organic ligand according to the invention, at least one of the previously listed metal salts is, preferably entirely, dissolved in a suitable solvent or solvent mixture. At least one of the previously listed organic ligands is, preferably entirely, also dissolved in a suitable solvent. These two solutions are subsequently combined to form one mixture.

Suitable and preferred solvents in accordance with the invention are aliphatic primary alcohols, such as methanol, ethanol, n-propanol, isopropanol, and butanol, as well as halogenated hydrocarbons, such as dichloromethane, chloroform, or tetrachlorocarbon. Particularly preferred solvents are methanol, chloroform, toluol, ethanol, or n-propanol. Further preferably, the solvent or solvent mixture used for the metal salt and the solvent used for the organic ligand are completely miscible with one another, more preferably identical.

Further preferably, the concentration of the organic ligand and/or the metal salt in the solutions to be mixed is 0.1 to 1 mol/l, preferably 0.2 to 0.4 mol/l. Further preferably, the organic ligand and the metal salt ion are present in the mixture at an equimolar ratio, wherein said ratio depends on the chemical structure of the organic ligand and not on the type of metal salt used. Particularly preferred equimolar ratios in accordance with the invention are 2:1, 1:1, or 1:2 mol/mol of organic ligand to metal salt ion.

The mixture of at least one dissolved organic ligand and at least one dissolved metal ion is intensively mixed at a temperature between 20° C. and 60° C., preferably between 22° C. and 28° C. for a period of 1-6 hours, preferably 2-3 hours. As a result, the formed complex compounds according to the invention are precipitated from the mixture and can be isolated in a conventional manner, for example, by filtration, purification through washing and drying.

In general, all antibacterially effective metals or metal salts can be combined with all above-mentioned organic ligands to form the complex compound according to the invention. However, the complex compound according to the invention is very particularly preferably formed from an organic ligand selected from the group consisting of polyethyleneimine, polyester polyol, stearic acid-2-oxazoline, behenic acid-2-oxazoline, 1,3-phenyl-bis-(2-oxazoline), 1,4-phenyl-bis-(2-oxazoline), and 2,2'-Bis-(2-oxazoline), as well as silver nitrate. More preferably, the complex compound according to the invention is formed from an organic ligand selected from the group consisting of amphiphilically modified polyethyleneimine or amphiphilically modified polyester polyol, stearic acid-2-oxazoline, behenic acid-2-oxazoline, 1,3-phenyl-bis-(2-oxazoline), 1,4-phenyl-bis-(2- oxazoline), and 2,2'-Bis-(2-oxazoline), as well as silver nitrate. Most preferred is a complex compound formed from an amphiphilically modified polyethyleneimine as well as silver nitrate.

The complex compounds according to the invention can subsequently be mixed with the hydrophilic polymer, very particularly preferably with a polyamide, in order to provide the antimicrobial composition. For this purpose, at least one hydrophilic polymer is usually mixed with at least one complex compound. This can take place in conventional mixing devices. For this purpose, the hydrophilic polymer is premixed, for example, as a granulate, with the powdery complex compound, and the mixture is melted in a suitable apparatus and homogenized in the melt. Additionally or alternatively and preferably according to the invention, the complex compound is added to the hydrophilic polymer, which is either pure or already mixed with the complex compound, during extrusion. Further preferably, this takes place by means of a sidestream dosing device on the extrusion device.

In the antimicrobial composition according to the invention, the complex compounds according to the invention are preferably embedded in the hydrophilic polymer and further preferably are present at particles sizes in or smaller than the nanometer range.

Further preferably, the complex compounds according to the invention are homogenously distributed in the hydrophilic polymer.

This antimicrobial composition according to the invention can be brought into a specific desired form. Preferably, said form is a form in which the ratio of the surface area to the volume and/or the mass of the antimicrobial composition is optimized. As a result, the volume which is taken up by the antimicrobial composition in the interior of the container can advantageously be reduced.

Preferred forms shall be described in more detail below, and it should be noted at this point that the antimicrobial composition according to the invention can preferably be present, among others, in the following forms: Granulate, plates, spun mat, nonwoven, foamed polymer, filter-like knitted fabric.

The quantity of the metal ions required for the reliable antimicrobial treatment of the service fluid depends on different parameters, in particular the quantity of the service fluid to be treated (or the volume of the container) and the surface area of the antimicrobial composition.

For example and preferably, in the case of a container holding 10,000 cm$^3$ and a surface area of 900 cm$^2$ of the antimicrobial composition, it is advantageous if the antimicrobial composition contains 10 wt. % of the complex compound and 90 wt. % of the hydrophilic polymer (preferably a polyamide), and wherein the complex compound has a metal content of 13 wt. %. Accordingly, the complex compound according to the invention consists in such case of 87 wt. % of the organic ligand (preferably a polyethyleneimine or a polyester polyol amphiphilically modified by means of an n-alkane carboxylic acid) and 13 wt. % of the metal (preferably silver), or the antimicrobial composition according to the invention consists of 90 wt. % hydrophilic polymer, 8.7 wt. % organic ligand, and 1.3 wt. % metal. The presence of such a combination advantageously resulted in a reduction in the number of microorganisms contained in the service fluid by 100% within an incubation period of 14 days.

The proportion of the complex compound according to the invention in the antimicrobial composition is preferably ≤15 wt. %, more preferably ≤13 wt. %, and even more preferably ≤11 wt. %. A preferred lower limit is ≥10 wt. % or >10 wt. % of the complex compound according to the invention in the antimicrobial composition. The proportion of the complex compound according to the invention in the antimicrobial composition also lies preferably in a range from ≥7 wt. % and ≤15 wt. %, more preferably at ≥9 wt. % and ≤15 wt. %, even more preferably at ≥10 wt. % and ≤13 wt. %, and most preferably at ≥10 wt. % and ≤13 wt. % or at >10 wt. % and ≤13 wt. %. The hydrophilic polymer—plus possible additional substances, such as additives, fillers, processing aids, color pigments, or lubricants—is contained in corresponding proportions in order to result in 100 wt. %.

The proportion of the metal in the antimicrobial composition preferably lies at ≥0.6 wt. %, more preferably at ≥0.8 wt. %, and most preferably at ≥1.0 wt. % or ≥1.3 wt. %. A preferred upper limit is ≤2 wt. % of the metal in the antimicrobial composition. The proportion of the metal in the complex according to the invention also preferably lies in a range from ≥0.6 wt. % and ≤2.0 wt. %, more preferably in a range from ≥0.8 wt. % and ≤1.5 wt. %, even more preferably in a range from ≥0.9 wt. % and ≤1.4 wt. %, and most preferably in a range from ≥1.1 wt. % and ≤1.4 wt. %. Most preferred is an antimicrobial composition with a proportion of the metal of 1.3 wt. %, in particular with 1.3 wt. % Ag.

As became apparent, the mechanical properties of the polymer-complex compound mixture according to the invention are directly dependent on the proportion of the metal in this mixture. In particular, it turned out that the mechanical properties are influenced negatively if the proportion of the metal exceeds a specific value. In individual tests, this value lay at approximately 0.6 wt. % of the metal. When this value was exceeded, the antimicrobial composition according to the invention tended to deform when forces acted on it, or it became mechanically less resilient. Accordingly, the antimicrobial composition is preferably designed as a non-bearing element of the container. If the antimicrobial composition is arranged as a non-bearing element of the container in the interior of the container, the proportion of the metal in the composition can advantageously be increased without resulting in structural problems of the container, such as deformations.

The ratio of the surface area of the antimicrobial composition arranged in the interior of the container to the volume of the interior of the container is preferably ≥0.06 or ≥0.15. Further preferably, the ratio of the surface area of the antimicrobial composition arranged in the interior of the container to the volume of the interior of the container lies in a range from ≥0.06 and ≤0.15 or ≥0.06 and ≤0.12, more preferably in a range from ≥0.08 and ≤0.10, and most preferably at 0.09.

In general, the antimicrobial composition according to the invention can be arranged in any suitable position in the interior of the container which can come in contact with the service fluid to be accommodated. For this purpose, the antimicrobial composition is preferably connected directly or indirectly to the inner wall, i.e., the inner surface, of the container. Further preferably, this connection is a detachable connection.

Preferably, the antimicrobial composition is at least partly arranged on the inner surface of the wall of the container that encompasses the interior. Particularly preferably, the composition according to the invention is in this case arranged as a layer on the inner surface of the wall of the container. Said layer thus at least partly lines the interior of the container. The layer can be applied to the inner wall or produced as part of the container wall during production of the container.

Alternatively or additionally, the antimicrobial composition can also be designed as a layer around an installation part arranged in the interior of the container, which layer at least partly surrounds the installation part. Preferred installation parts are selected from the group consisting of a baffle element, a swirl pot, a baffle plate, a heating film, or a PTC heating polymer.

The layer made of the composition according to the invention is preferably applied by subsequent application to, and/or one-piece forming with, the container wall and/or the installation part. Particularly preferably, the layer is applied to the inner surface of the container wall and/or the installation part using the two-component process (2-C process) or a coextrusion process.

Very particularly preferably, the inner surface of the wall of the container is lined substantially entirely with the layer made of the composition according to the invention.

In the case that the installation part is a non-bearing installation part of the container, said installation part can further preferably be produced from the composition according to the invention. Preferred examples of such non-bearing installation parts are selected from the groups consisting of a baffle element, a swirl pot, a plate, in particular a baffle plate, a mat spun from the composition (spun mat), a filter-like knitted fabric containing the composition, and a foam produced from the composition. In a particularly preferred embodiment, which shall be described in more detail below, the installation part is a partial volume of the container interior, most preferably a cage or a net, in particular a textile net.

In a further preferred embodiment, the antimicrobial composition or the installation part is designed in the manner of a plate. This is particularly advantageous because such a plate can preferably serve as a baffle element. Further preferably, the plate is produced using the injection molding process and, even further preferably, it can have perforations which allow the service fluid to pass through.

The composition according to the invention can preferably also be present in the form of a granulate which is poured into the container. Among other things, this has the advantage that the surface area of the composition introduced into the container is enlarged. As a result, the metal ions can diffuse more quickly into the service fluid, i.e., a faster efficacy is achieved. In addition, the usable volume of the container is less reduced by the introduced composition according to the invention.

Even further preferably, the antimicrobial composition—in this case very particularly preferably the granulate—is arranged within a partial volume of the container, which is fluidically connected to the interior of the container. The service fluid located in the interior of the container can thus flow through the partial volume. However, the boundary of the partial volume is not permeable to the composition according to the invention. This has the advantage that the composition according to the invention is available in a collected manner within the container and, for example due to its small diameter, it cannot be removed via a removal opening of the container.

Further preferably, the partial volume can be connected to the container in a detachable or non-detachable manner, or may not be connected to the container. Even more preferably, the partial volume can be connected to the container in a detachable manner. This has the advantage that the granulate can be arranged or fixed at a defined location in the container and is also easier to replace.

The partial volume can be formed in any suitable manner. In particularly preferred embodiments, the partial volume is formed by a lattice sphere, a net, or a cage. Very particularly preferably, the cage itself also comprises the antimicrobial composition or is made of said antimicrobial composition. Conversely, the cage can also be made from any suitable other material. This material is preferably a material that can be easily connected to the inner wall of the container in a non-detachable manner.

Both the installation part arranged in the container and the partial volume can preferably be connected to the container in a detachable or non-detachable manner. In both cases, the precise and permanent positioning of the antimicrobial composition is advantageously possible, so that, for example, the space available in the interior of the container can be optimally utilized. For the above-mentioned reasons, a detachable connection is particularly preferred.

The installation part or the partial volume can be connected to the container in any suitable manner.

In the case of a non-detachable connection, welding and/or gluing are in particular preferred. Welding is called for in particular if both components to be welded together are made of a plastic. This is in particular the case if the inner wall of the container has a layer of the composition according to the invention, and the component to be welded to it also has the composition according to the invention as a layer or even consists of said composition.

In the case of detachable connections, in particular detachable mechanical connections based on a force- and/or form-locked connection are preferred. Very particularly preferred is a connection via a dovetail and a snap-in lug or via a clip connection. In particular the latter is particularly advantageous for use in injection molding. It is also easy to position and install and acoustic control of the installation is possible. The installation part arranged in the container and/or the partial volume preferably comprise a dovetail and/or a snap-in lug. Preferably, the installation part arranged in the container and/or the partial volume also preferably comprise a clip connection device.

Further preferably, the antimicrobial composition is, at least to some extent, arranged in the bottom area of the container. This is further advantageous because the composition according to the invention can be contacted by the service fluid even if the container is not entirely filled with said service fluid. The term "bottom area" preferably refers to the lower half, more preferably to the lower third, of the volume of the container in which the service fluid is collected when the container is in its installation position, i.e., was installed, for example, in a motor vehicle, or rests on the floor. Very particularly preferably, the installation part and/or the partial volume is connected to the inner side of the bottom of the container or rests on said bottom. If the antimicrobial composition consists of granulate, it preferably has a density that is greater than the density of the service fluid and thus also sinks to the bottom of the container, i.e., the granulate rests on the bottom of the container. Particularly preferably, the density of the antimicrobial composition is >1 (at 20° C. and standard pressure).

In a preferred embodiment, as described above, the antimicrobial composition is present in the form of a granulate and arranged within a preferably non-bearing installation part, which is designed as a partial volume, in the interior of the container. The partial volume—and thus also the granulate—is fluidically connected to the interior of the container. As also described above, said partial volume is further preferably a cage or a net. Accordingly, it is ensured that the service liquid located in the container can contact the granulate located in the partial volume and be treated in an antimicrobial manner while the granulate remains collected within the partial volume. The partial volume, more preferably, the cage or the net, also preferably has an opening which can be arranged within the closeable opening. This is particularly advantageous if the closeable opening is a filling opening of the container. A poured in volume can then flow through the filling opening and further through the opening of the partial volume into the partial volume and can be released into the container interior after antimicrobial treatment.

A preferred embodiment relates to a container, wherein the antimicrobial composition is arranged within a partial volume of the container, which is fluidically connected to the interior of the container. The antimicrobial composition is still present in the form of a granulate, and the partial volume is reversibly fastened to the container by means of a fastening device which has a closeable opening in the container wall—preferably in the upper container shell or the lower container shell—and is arranged in the interior of the container.

In other words, the closeable opening in the container wall is a component of the fastening device. The fastening device is used to fasten and/or arrange the partial volume, or the partial volume is reversibly connected to the container by means of the fastening device. The antimicrobial composition in the form of a granulate is arranged within the partial volume. The partial volume is designed such that it allows for a fluidic connection between the granulate arranged in said partial volume and the service fluid located in the container. For this purpose, the partial volume is preferably designed as a cage or a net. An efficient antimicrobial treatment of the service fluid is thus made possible.

A reversible connection of the partial volume to the closeable opening in the wall of the container by means of a fastening device refers to a detachable connection, preferably a connection detachable in a damage-free manner. This includes substantially all connection types that cannot be attributed to integral bonding connection types (in particular welding and/or gluing) or do not have at least one such integral bonding connection type. The reversible connection is particularly preferably a form- and/or force-locking connection, further preferably an exclusively form- and/or force-locking connection. The basic concept of the reversible connection according to the invention is that of allowing improved serviceability of the container. In this regard, a reversible connection of the partial volume to the container has several advantages.

For example, elaborate, error-prone and expensive welding and/or gluing of the partial volume to the container can be omitted due to the reversible connection. In addition, the partial volume can be replaced easily, cost-effectively and without the risk of damaging the container and thus having to replace the entire container. As a result, the depleted antimicrobial composition can be replaced significantly easier than would be the case with welding and/or gluing. Furthermore, the partial volume can preferably be replaced from the outside of the container. If the closeable opening, according to a preferred embodiment, is located on a lower container shell, on the container underside, on the container bottom and/or a sidewall of the container, the partial volume can advantageously be replaced without prior removal of the container, e.g., from a motor vehicle.

The closeable opening in the container wall can be any closeable opening of the container. Such an opening is intended to refer an opening that penetrates the container wall. In other words, the closeable opening in the container wall represents a channel through the container wall. Said channel allows for a fluid balance between the interior of the container and the environment surrounding the container. Further preferably, the fluid is a gas.

The closeable opening is preferably used for establishing a fluidic connection between the interior of the container and the environment of the container. Even further preferably, the closeable opening is an opening which, in addition to its function as a component of the fastening device, performs at least one further function for the intended use. Very particularly preferably, the closeable opening is an air-inlet and/or ventilation opening of the service container. The closeable opening is particularly preferably also a filling opening of the service container.

The closeable opening is a component of the fastening device for reversibly connecting the partial volume to the container. This is intended to mean that the fastening device utilizes the channel extending through the container wall. The edge area, i.e., the wall material which is arranged in the vicinity of the opening, or encompasses or defines the opening/channel, is particularly preferably used as a fastening point for this purpose.

The use according to the invention of the closeable opening of the container as a component of the fastening device has numerous advantages. For example, an opening already required in the wall of the container, which is preferably used for air supply and/or ventilation, for filling the service fluids container and/or for accommodating a valve, is used for a further purpose, namely for fastening the partial volume in the interior of the container. As a result, welding and/or gluing of the partial volume to the inner wall of the container can be omitted. An additional advantage is that of being able to already produce part of the fastening device during the production of the container. Furthermore, a reversible connection between the partial volume and the container can be realized with simple means, which allows for a significantly simplified replacement of the partial volume. This is particularly advantageous if the opening is an opening for air supply and/or ventilation or a filling opening which, in addition to its function as a pressure compensating means or filling means, prevents contamination of the service fluid with microorganisms.

In a preferred and advantageous manner, the closeable opening in the wall of the container can be closed by fastening the partial volume by means of the fastening device. Once again, further/additional process steps, which, among others, would require welding and/or gluing of the opening, can be omitted.

Further preferably, the closeable opening in the container wall has an inward protrusion of the container wall into the interior of the container and/or an outward protrusion.

The inward protrusion or the outward protrusion of the container wall is a structural design of the container wall, in which wall material is oriented from the plane of the container wall in the direction of the container interior (inward protrusion) or in the direction of the environment of the container (outward protrusion). In other words, the lateral surface of the channel penetrating the container wall, which surface is formed by the wall material, is enlarged by an inward protrusion and/or an outward protrusion. As a result, an improved, in particular form-locking and/or force-locking fastening of the partial volume by means of the fastening device can advantageously be achieved. Preferably, this applies particularly if a connection means for form-locking and/or force-locking fastening is provided in the region of the inward protrusion and/or the outward protrusion. Said means is preferably a thread, a means for a screw connection, a means for an interference-fit connection, a means for a press-fit connection, a means for a bayonet connection, or a means for a clip connection.

Further preferably, the inward protrusion and/or the outward protrusion is produced so as to be integral with the container wall. This provides the additional advantage that a further part of the fastening device can already be produced during the production of the container wall or the container.

The container also preferably has a closure which can be inserted into the closeable opening of the container from the outside of the container. The closure further preferably allows closing of the closable opening in a fluid-tight manner. More preferably, the partial volume can additionally be inserted into the closeable opening from the interior of the container. Even more preferably, the closure is a component of the fastening device. This is advantageous, among other things, because the closeable opening is closed in a simple and secure manner when the partial volume is fastened.

Further preferably, the closure is inserted into the closeable opening of the container and fastened in a force-locking and/or form-locking manner. Even further preferably, the partial volume is inserted into the closeable opening and fastened in said opening in a force-locking and/or form-locking manner. As a result, the closeable opening is closed from the outside of the container at least by the closure, and the partial volume is securely arranged within the container.

Preferably, the closure has an outer wall and an inner wall and, further preferably, contacts the inward protrusion and/or the outward protrusion in the container wall with its outer wall. As a result, particularly secure form-locking and/or force-locking fastening can be achieved.

Even further preferably, the clear width of the inward protrusion and/or the outward protrusion decreases in the direction of the interior of the container. As a result, in particular more reliable fastening between the closure and/or the partial volume and the closeable opening can be achieved.

As already described above, the form-locking and/or force-locking fastening of the closure can preferably be provided via connection means which are arranged on the opening, particularly preferably on the inward protrusion and/or the outward protrusion. The form-locking and/or force-locking fastening of the closure can preferably also be provided via connection means which are arranged on the closure, particularly preferably on the outer wall of the closure. In a very particular embodiment, said connection means are arranged both on the opening, in particular on the inward protrusion and/or the outward protrusion, and on the closure and interact with one another.

The partial volume preferably has an outer wall and an inner wall and, further preferably, with its outer wall, it contacts the inward protrusion and/or the outward protrusion in the container wall. As a result, particularly secure form-locking and/or force-locking fastening can be achieved.

Further preferably, the form-locking and/or force-locking fastening of the partial volume can be produced via connection means which are arranged on the container wall, particularly preferably on the inward protrusion and/or the outward protrusion. The form-locking and/or force-locking fastening of the partial volume can preferably also be produced via connection means which are arranged on the partial volume, particularly preferably on the outer wall of the partial volume. In a very particular embodiment, said connection means are arranged both on the container wall, in particular on the inward protrusion and/or the outward protrusion, and on the partial volume and interact with one another.

The form-locking and/or force-locking fastening of the closure and/or the partial volume can preferably also be produced via connection means which are arranged on the closure and/or the partial volume. In a very preferred embodiment, one connection means is arranged on the inner wall of the closure and one connection means is arranged on the outer wall of the partial volume, and the two connection means interact with one another. Furthermore, the closure contacts the closeable opening, in particular an inward protrusion thereof, with its outer wall. As a result, a particularly secure connection is ensured, in particular in the case of an interference-fit connection or a press-fit connection.

The connection means for producing form-locking and/or force-locking fastening can be arranged on the closeable opening and/or on the closure and/or on the partial volume. The opening can have connection means for connecting to the closure and/or the partial volume. The closure can have connection means for connecting to the opening and/or the partial volume and can be fastened to the opening and/or the partial volume. The partial volume can have connection means for connecting to the opening and/or the closure and can be fastened to the opening and/or the closure. Particularly preferably, one connection means is arranged on the outer wall and/or the inner wall of the closure. One connection means is arranged, also particularly preferably, on the outer side of the partial volume. It must again be noted that all of the connections produced in this manner are preferably reversible connections, which ensures that the container is easy to service.

Particularly preferred examples of such in particular interacting connection means include threads, means for a screw connection, means for an interference-fit connection, means for a press-fit connection, means for a bayonet connection, or means for a clip connection.

In a further preferred embodiment, a sleeve, in particular a plastic or rubber sleeve, is arranged between the closure inserted into the opening and the container wall.

Particularly preferably, said sleeve is arranged between the outer wall of the closure and the inward protrusion and/or the outward protrusion. As a result, a particularly secure and also fluid-tight fastening of the closure in the closeable opening is ensured. If such a sleeve is present, the closure contacts the opening indirectly via the sleeve.

In a further preferred embodiment, the partial volume, or a partial volume connectable to a closure, can be inserted from the outside of the container into the closeable opening of the container, and the inserted partial volume or the closure connectable to the partial volume is suitable for closing the closeable opening. Particularly preferably, the closeable opening can in this case be closed by the closure in a fluid-tight manner.

Once again, this results in the advantage that an opening already present in the container wall is utilized for the reversible fastening and positioning of the antimicrobial composition. This arrangement also ensures, once again, that the container is easy to service or that the depleted antimicrobial composition can be replaced simply, securely and cost-effectively. This applies particularly to the serviceability from the outside of the container.

Particularly preferably, the partial volume insertable into the closeable opening of the container from the outside of the container is produced so as to be integral with the closure which is suitable for closing the closeable opening.

Particularly preferably, the partial volume is inserted into the container from below and from the outside of the container when the container is in its installation position. This has the further advantage that a removal of the container is not required, and the antimicrobial composition is also positioned such that the service fluid can wash around it in a reliable manner.

Further preferably, the partial volume, or a partial volume connectable to a closure, is inserted into the container and force-lockingly and/or form-lockingly fastened therein, and the inserted partial volume or the closure connected to the partial volume closes the closeable opening. For this purpose, the closeable opening is further preferably closed in a fluid-tight manner.

As already described above, the partial volume, opening and/or closure preferably have connection means for producing the form-locking and/or force-locking fastening, which, more preferably, can interact with one another. If the closure and the partial volume interact with one another via one or more connection means arranged on one or both elements, it can also be said that the closure is also a component of the fastening device for reversibly fastening the partial volume to the container.

Particularly preferred examples of such, in particular interacting, connection means include threads, means for a screw connection, means for an interference-fit connection, means for a press-fit connection, means for a bayonet connection, or means for a clip connection.

Further preferably, the container, partial volume and/or closure are made of plastic, wherein in particular production using the injection molding process is preferred. More preferably, the container or the container shells are made of plastic by means of the injection molding process. The partial volume and the closure are also particularly preferably made of plastic by means of the injection molding process.

As already described above, the partial volume is preferably designed as a cage or a net. This has the advantage that the liquid present in the container can reliably be brought into contact with the antimicrobial composition which is arranged within the partial volume. In this case, it is simultaneously effectively prevented that the antimicrobial composition present as a granulate can escape from the partial volume. As a result, once again it is easier to service the container, in particular the depleted antimicrobial composition can be completely replaced easily.

In a particularly preferred embodiment, the cage is designed as an injection-molded part, wherein the cage, further preferably, has a substantially cylindrical or tubular shape. Further preferably, the wall of the cage is designed, at least in sections, as a lattice. This allows for a simple fluid exchange from the container interior into the interior of the cage containing the granulate. Even further preferably, the diameter of the openings of the lattice is smaller than the diameter of the antimicrobial granulate.

In a further particularly preferred embodiment, the partial volume designed as a net is a textile net. Such textile nets are inexpensive, easily available, and easily disposable, and they preferably have openings with diameters that are smaller than the diameter of the antimicrobial granulate. Further preferably, the textile net is injected into a plastic ring which serves as a connection means within the meaning of the invention. In other words, the textile net can be connected to the closeable opening and/or the closure via the plastic ring.

In a further embodiment, the closure insertable into the closeable opening of the container has a valve and/or a membrane, particularly preferably a semipermeable membrane. This is particularly advantageous if the closeable opening is an air-inlet and/or ventilation opening of the container. In such case, it is further preferred that the closure has a channel which establishes a fluid connection of the container interior with the semipermeable membrane.

The closure preferably has a substantially cylindrical shape. Further preferably, the opening of the closure with a cylindrical shape, which opening faces the outside of the container, is closed by the semipermeable membrane.

The term "semipermeable membrane" refers to a semipermeable or partially permeable membrane which is permeable in particular to gases, while it is not permeable to liquids. Accordingly, such a semipermeable membrane acts similarly to a valve and can be used to ensure a gas exchange of the container with its environment, while liquids cannot escape from the container or enter the container.

In a further embodiment, the closure insertable into the closeable opening of the container has a lid which can be designed to be integral with or, particularly preferably, connectable to the closure. A lid connectable to the closure via a force- and/or form-locking connection is particularly preferred. Very particularly preferably, the lid has connection means for forming a clip connection with the closure.

In a further preferred embodiment, the closure insertable into the closeable opening of the container has a connection for a hose, for example, a nipple. Further preferably, a hose is connected to said hose connection. As a result, for example, an increased fording depth of the vehicle in which the container according to the invention is installed can be achieved. Very particularly preferably, the connection for a hose is a component of the lid connectable to the closure.

The different embodiments of the antimicrobial composition according to the invention can be freely combined with one another as long as there are no apparent inconsistencies. For example, a coated inner wall of the container can be combined with granulate arranged in a cage, wherein the cage is connected to the container bottom, and wherein said connection is established in a detachable manner via a dovetail or a clip connection of the cage.

The present invention also relates to a method for antimicrobial storage of water or aqueous solutions using the container described above. The method preferably comprises the step of pouring water or an aqueous solution into the container according to the invention. As a result, the number of microorganisms contained in the water or the aqueous solution can be effectively reduced.

The method according to the invention can further preferably comprise the step of removing and/or replacing the water or the aqueous solution in the container.

Preferably, the method according to the invention also comprises an incubation step prior to the removal and/or replacement step. During the incubation step, the water or the aqueous solution is further preferably stored in the container for at least one day, three days, five days, one week, two weeks, or three weeks. During said incubation period, the metal ions contained in the antimicrobial composition according to the invention diffuse into the water or the aqueous solution and effectively reduce the number of microorganisms present therein.

The previously described individual embodiments of the invention can be freely combined with one another, provided that nothing to the contrary was specified, or an obvious exclusion opposes such a combination.

Figure 2:
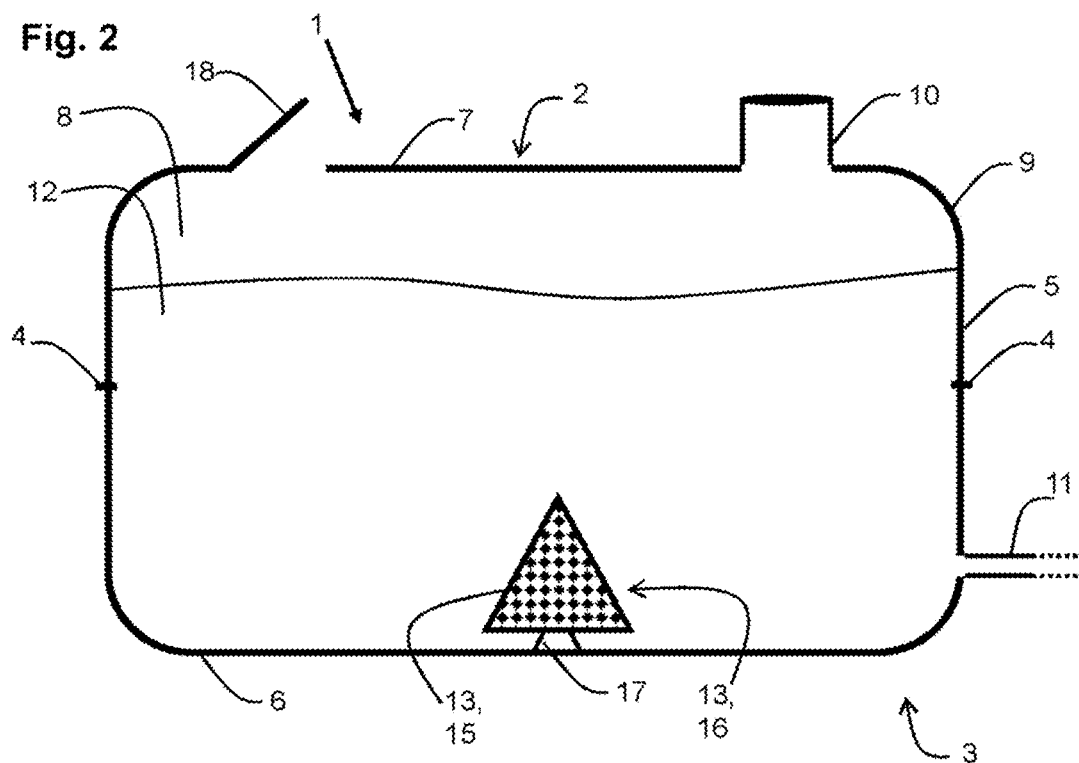

Further advantages, details, and features of the invention shall be described using the following embodiments. In the drawings:

FIG. 1: is a schematic section through the container according to the invention, in which the antimicrobial composition is arranged in the form of installations, in particular baffle plates, in the container;

FIG. 2: is a schematic section through the container according to the invention, in which the antimicrobial composition is arranged as a granulate and within a partial volume in the form of a cage in the interior of the container;

FIG. 3: is a schematic section through the container according to the invention, in which the antimicrobial composition is arranged as a granulate and within a partial volume in the form of a net in the interior of the container. In addition, a layer of the antimicrobial composition is applied to the inner wall of the container;

FIG. 4: is a schematic overview of the cage from FIG. 2;

FIG. 5: shows the results of two efficacy studies using the container according to the invention;

FIG. 6A: is a schematic section through the container according to the invention, in which a closable opening of the container is used for fastening a partial volume which contains antimicrobial granulate;

FIG. 6B: shows an enlargement of the region of the closeable opening according to FIG. 6A;

FIG. 6C: shows an enlargement of the region of the closeable opening according to a further variant;

FIG. 6D: shows an enlargement of the region of the closeable opening according to a further variant;

FIG. 6E: shows an enlargement of the region of the closeable opening according to a further variant;

FIG. 7A: is a schematic detailed view of the closure according to the invention which is insertable into the closeable opening of the container;

FIG. 7B: is a schematic depiction of a lid for the closure according to the invention which insertable into the closeable opening of the container;

FIG. 8A: is a schematic depiction of a partial volume in the form of a textile net which is inserted from outside into and fastened to the closeable opening arranged in the container bottom of the container according to the invention;

FIG. 8B: is a schematic depiction of a partial volume in the form of a cage which is inserted from outside into and fastened to the closeable opening arranged in the container bottom of the container according to the invention;

FIG. 9A: is a schematic depiction of a partial volume in the form of a cage screwed from outside into the closeable opening arranged in the container bottom of the container according to the invention; and FIG. 9B: is a top view of the closure of the partial volume.

In the following description, the same reference signs denote the same components or the same features, and so a description regarding a component with reference to one figure also applies to the other figures, thus avoiding a repetitious description.

FIG. 1 is a schematic section through the container (1) according to the invention. The container (1) is a service fluids container for an aqueous cleaning solution (12) for cleaning the windshields of a motor vehicle.

The container (1) consists of a plastic (HDPE) and is composed of two half-shells, the upper shell (2) and the lower shell (3), wherein the two half-shells were connected at the weld seam (4) to form the container. The two half-shells were produced using the injection molding process.

The container (1) has a substantially cuboidal shape and has two opposite sidewalls (5) and a container bottom (6) and a container top (7).

The container (1) forms a hollow body, the interior (8) of which is delimited by the peripheral container wall (9), more specifically by the inner surface of said wall. The volume of the container (1), i.e., the volume of the interior (8) of the container (1) is 10,000 cm$^3$ or 10 l.

The container (1) furthermore has a closeable filling device (10) which is arranged in the container top (7), i.e., the upper shell (2), and is in the form of a filler neck. The container (1) also has a removal device (11) which is arranged in the sidewall (4) in the region of the lower shell (3) and is designed in the form of a partially depicted removal hose.

Furthermore, the container (1) is partly filled with a service fluid (12) which fills up the interior (8) of the container. The service fluid (12) is an aqueous cleaning solution for the windshields of a motor vehicle. The service fluid (12) was poured into the service fluids container (1) via the closeable filler neck (10) and, if necessary, it can be removed from the service fluids container (1) via the hose (11).

Within the container (1), i.e., in the interior (8) of the container (1), two installation parts (14) in the form of two baffle elements (14), in particular two perforated baffle plates, can be seen which consist of the antimicrobial composition (13) according to the invention. As a result, a long-lasting depot effect is achieved which ensures that the metal ions from the antimicrobial composition (13) are present in the service fluid (12) in a sufficient concentration in order to effectively reduce the number of microorganisms in said service fluid.

Both baffle plates (14) are arranged in the bottom area of the container (1). Furthermore, they are placed substantially perpendicularly on the container bottom (6) and extend in their longitudinal extension in the direction of the container top (7).

The two baffle plates (14) were produced from the antimicrobial composition (13) using the injection molding process. The perforation of the two baffle plates (14) makes it possible for the service fluid (12) to penetrate the two baffle plates (14) in the case of acceleration forces acting on the vehicle, wherein a calming of swirling movements is nevertheless achieved.

The two baffle plates (14) are rigidly, i.e., non-detachably, connected to the container wall (9). For this purpose, the two baffle plates (14) were welded to the inner surface of the lower container shell (3) before the two half-shells (2, 3) were welded together to form the container (1).

The overall surface area of the two baffle plates (14) is approximately 900 cm$^2$. The thickness of the two baffle plates (14) is approximately 2 mm. The shot weight of the two baffle plates (14) is altogether 180 g.

The antimicrobial composition consists of the complex compound according to the invention consisting of a polyethyleneimine (LUPASOL) amphiphilically modified with an n-alkane carboxylic acid, and 1.3 wt. % silver at a ratio of 1:9 with a copolyamide 6/66.

FIG. 2 shows a schematic section through a container (1) according to the invention, which substantially corresponds to the container (1) of FIG. 1.

Instead of the baffle plates (14) of FIG. 1, a partial volume (16) is arranged in the container (1). The partial volume (16) of the container (1) is designed as an installation part, in particular as a cage which shall be described in more detail below.

The cage (16) has substantially the shape of a three-sided, straight prism. The side surfaces of said prism are perforated, wherein the regularly arranged perforation openings have a diameter of 2 mm. As a result, the interior of the cage (16) is fluidically connected to the interior (8) of the container (1), and the service fluid (12) can flow from the container interior (8) into the interior of the cage (16) and back out again.

The cage (16) is detachably connected to the inner surface of the lower container shell (6) or the container bottom (9). The detachable connection is hereby achieved via a connection device (17) which consists of a combination of a dovetail, which is inserted into a corresponding seat in the container bottom (9), and a snap-in lug (not depicted) which secures the dovetail against slipping out. The detachable connection advantageously ensures that the cage (16) can be inserted into the container (1) or removed or replaced, for example, through a further opening (18) which can also be designed as an inspection flap.

The cage (16) was made of HDPE by means of the injection molding process. In a preferred further embodiment, it is produced from the antimicrobial composition according to the invention by means of the injection molding process. The cage (16) is foldable, wherein the side surfaces are interconnected via living hinges and the folded cage is held together preferably via a clip connection (for example, via C clips). The wall thickness of the cage (16) is approximately 2 mm.

Due to the foldability of the cage (16), the antimicrobial composition (13, 15) according to the invention can be easily introduced into and/or removed from the interior of said cage. As a result, a replacement of the depleted antimicrobial composition is advantageously simplified. Furthermore, the presence of the inspection flap (18) additionally simplifies said replacement because the antimicrobial composition does not have to be replaced within the container (1). The inspection flap (18) is further advantageous because the partial volume (16) of the container (1) can be easily introduced into the container (1) even after the two half-shells (2, 3) have been welded together.

As is also shown in FIG. 2, the interior of the partial volume, or the folded cage (16), contains the antimicrobial composition (13) according to the invention in the form of a granulate (15). The granulate (15) has a diameter that is larger than the diameter of the perforations in the sidewalls of the cage (16). As a result, it is effectively prevented that the granulate (15) reaches the interior (8) of the container (1), i.e., escapes from the partial volume (16), through the perforation of the cage (16).

The weight of the granulate (15) in the interior of the partial volume (16) is merely approximately 63 g despite the same surface area (900 cm$^2$) and at the same antimicrobial efficacy. In addition, the granulate (15) takes up a volume of only approximately 80 ml. This is the case because the use of a granulate (15) instead of baffle plates (14) increases the surface area of the antimicrobial composition (13) according to the invention approximately by a factor of 3. As a result, the volume occupied by the antimicrobial composition (13) in the interior (8) of the container (1) can be advantageously minimized.

The granulate (15) of the antimicrobial composition consists of: The complex compound according to the invention consisting of a polyester polyol (Bolthorn H40) amphiphilically modified by means of an n-alkane carboxylic acid, and 1.3 wt. % silver at a ratio of 1:9 with a copolyamide 6/66.

FIG. 3 shows a schematic section through a container (1) according to the invention, which substantially also corresponds to the container (1) of FIG. 1 or FIG. 2.

The container (1) consists of a coextrudate of a plastic (HDPE) with the antimicrobial composition (13) according to the invention which is applied as a layer (19) to the inner surface of the container (1). Initially, two half-shells (2, 3) were once again produced, which were then welded together to form the hollow-body-shaped container (1). Advantageously, such coextrusion results in the composition (13) according to the invention substantially completely lining the interior (8) of the container (1).

In addition to the layer (19), two partial volumes (16) are also arranged in the interior (8) of the container (1) which are filled with the composition (13) according to the invention. The two partial volumes (16) are nets (20) made of plastic. Both nets (20) contain the antimicrobial composition (13) according to the invention as a granulate (15) with a diameter of approximately 2 mm. The mesh size of the two nets (20) is smaller than the diameter of the granulate (15).

Since the granulate (15) or the antimicrobial composition (13) has a density that is greater than 1, the two nets (20) filled with the granulate (15) sink to the container bottom (6). No fastening of the two nets (20) at the container bottom (6) is present. Among other things, this is advantageous because the two partial volumes (16) can be easily introduced into and/or removed from the container (1). In addition, the resulting mobility of the two partial volumes (16) in the container (1) ensures that the antimicrobial composition (13) contained therein is mixed regularly, resulting in an improved release of the metal ions into the service fluid (12).

The nets (20) filled with the granulate (15) can easily be introduced into and/or removed from the container (1) through the inspection flap (18). Advantageously, the nets (20) filled with the granulate (15) can be thus introduced into the container (1) after the container (1) has been filled with service fluid (12), which can be carried out, for example, by the driver of the motor vehicle. This is particularly advantageous because fastening of the nets (20) is not required.

The antimicrobial composition consists of: The complex compound according to the invention consisting of an amphiphilically modified polyethyleneimine, and 1.3 wt. % silver at a ratio of 1:9 with a copolyamide 6/66.

Figure 4A:
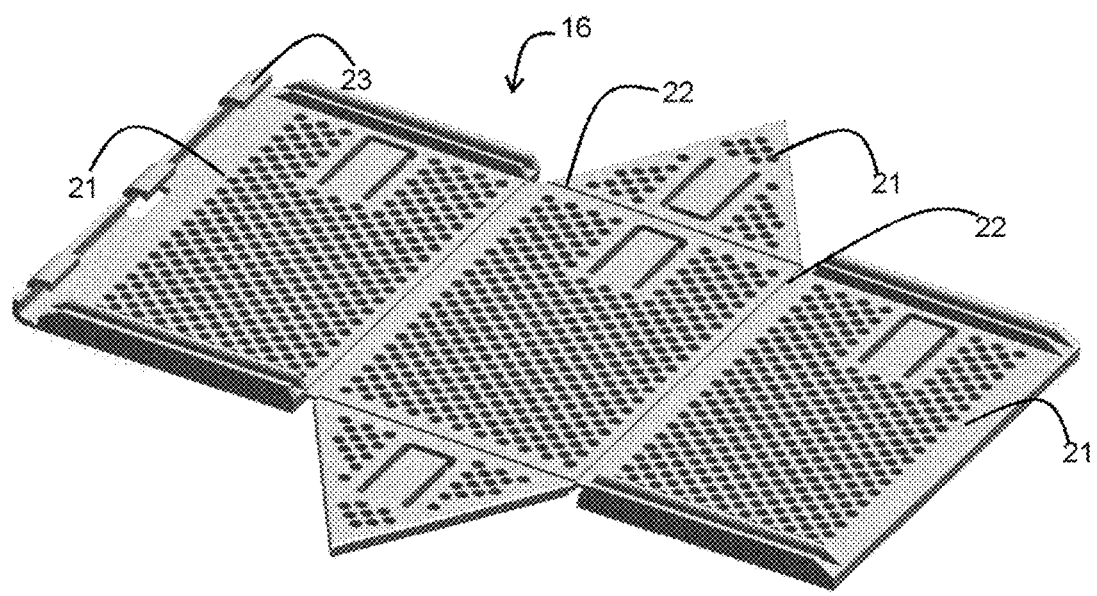

FIG. 4a is a detailed schematic view of the partial volume, or installation part (14, 16), shown in FIG. 2. It shows the foldable cage (16) already described above. Said cage was produced from a plastic, in particular HDPE, by means of the injection molding process. In a further very preferred embodiment, as also mentioned above, the partial volume or the cage (16) is also made of the antimicrobial composition (13) according to the invention. Despite the increased metal ion concentration, it is possible that said partial volume (16) is a non-bearing element of the container (1).

The cage (16) has the shape of a three-sided straight prism with perforated side surfaces (21). The perforation consists of holes or openings arranged regularly in the side surfaces (21) of the cage (16) with a diameter of 2 mm. As a result, the interior, which results from the folding of the cage (16), is fluidically connected to the interior (8) of the container (1).

In order to ensure the folding of the cage (16), the perforated side surfaces (21) are interconnected via living hinges (22). A connection device (23) designed as a clip connection further ensures that, after folding, the cage (16) remains in its folded state. For this purpose, two C clips, which are arranged on a first side surface (21) of the cage (16), engage in two corresponding recesses (not depicted) that are arranged on a second side surface (21) which bears directly against the first side surface (21) of the cage (16) after folding.

Figure 4B:
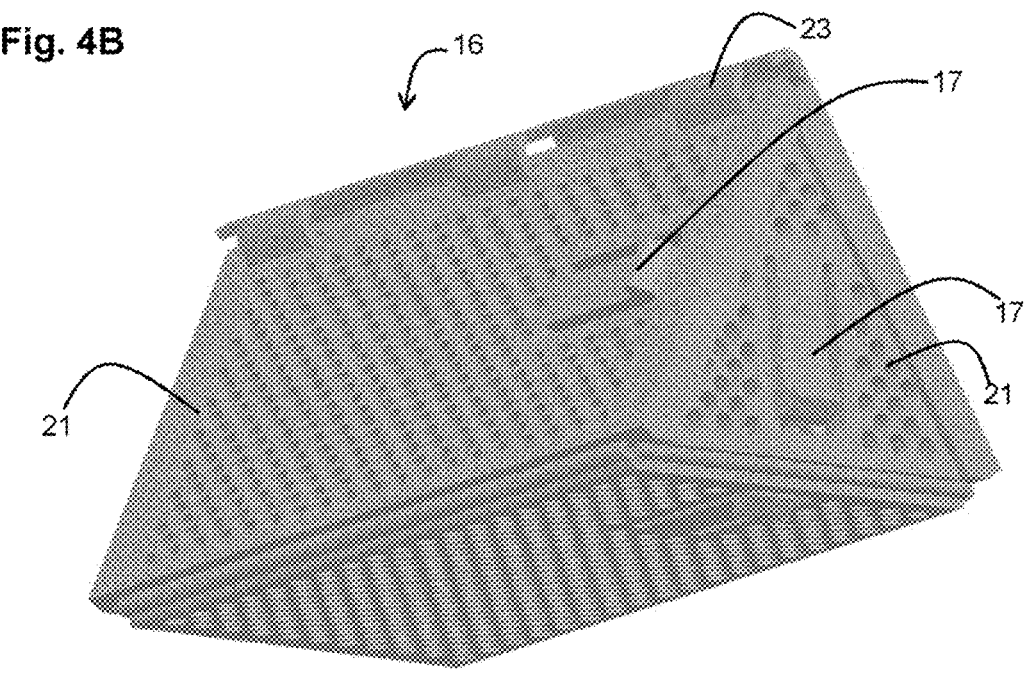

FIG. 4b is a view of the folded cage (16) from FIG. 4a. It further shows three detachable connection devices (17) arranged on each side surface (21) of the cage (16), by means of which devices the folded cage (16) is connected to the inner surface of the container bottom (6). As already mentioned above, the partial volume (16) can in principle be fastened to any location within the interior (8) of the container (1), although, however, the bottom area is preferred for the reasons mentioned above.

The connection device (17) preferably consists of a dovetail which engages in, or can be inserted into, a corresponding recess in the inner surface of the container wall (9). For securing the connection device (17) against slipping out, it preferably also has a snap-in lug which also engages in a corresponding recess in the inner surface of the container wall (9). This ensures that the partial volume (16) or the cage can be securely fastened in the interior (8) of the container (1) and still be replaced, if required.

FIG. 5 shows the result of two experimental proofs on the efficacy of the composition (13) according to the invention.

Figure 5A:
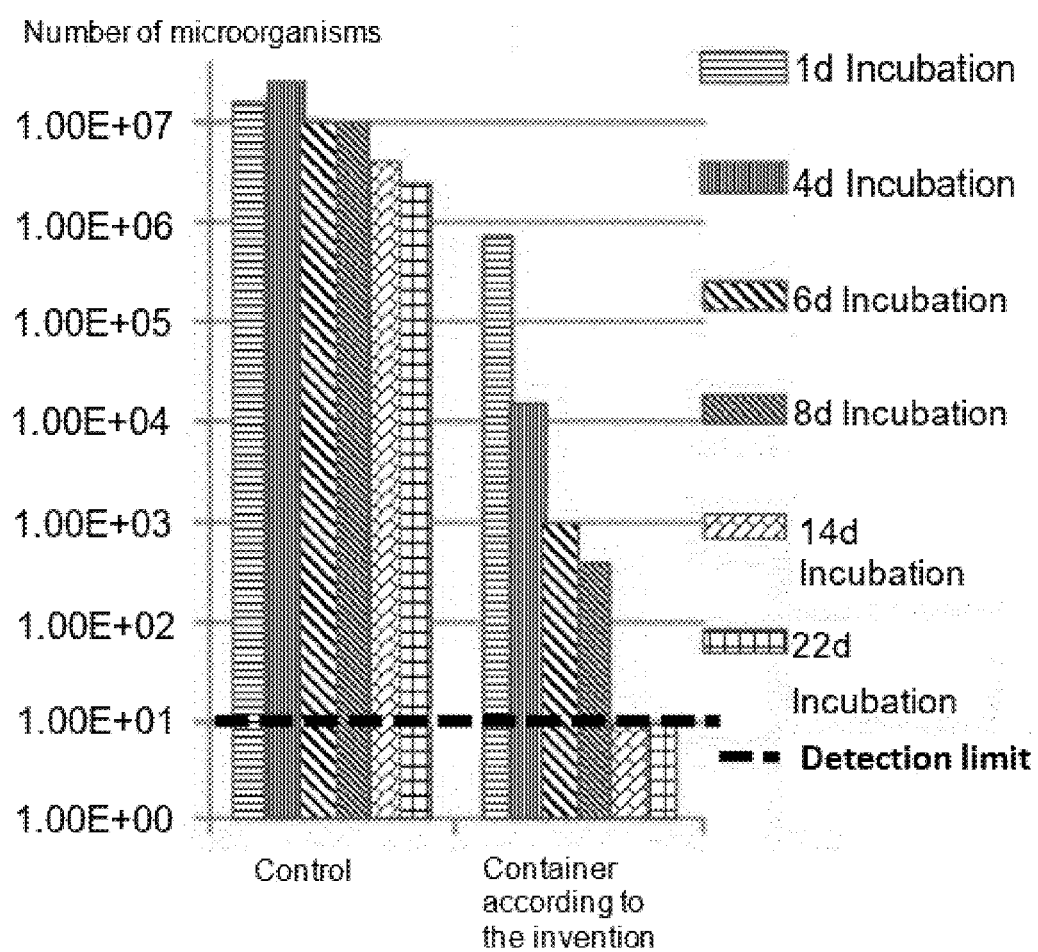

For this purpose, the container (1) according to the invention shown in FIG. 1 was initially compared with a container with identical volume which, however, did not contain the composition (13) according to the invention (control container). The results are shown in FIG. 5a.

More specifically, deionized water (200 mS) was stored either in the container (1) according to the invention or in the control container.

As mentioned above, the container (1) according to the invention contained two baffle plates (14) as installation parts which together had a surface area of 900 cm$^2$ and a shot weight of 180 g.

The two baffle plates were made of the composition (13) according to the invention by means of the injection molding process. Said composition consisted of 10 wt. % of the complex compound according to the invention consisting of an amphiphilically modified polyethyleneimine, and 1.3 wt. % silver at a ratio of 1:9 with a copolyamide 6/66 as the hydrophilic polymer, and it had a proportion of 1.3 wt. % of antimicrobially effective silver.

After a specific incubation period, samples were taken from both containers in order to detect the number of microorganisms contained therein. The detection was carried out after one day, four days, six days, eight days, 14 days, and 22 days.

As can be seen in FIG. 5a, the control container showed substantially no reduction in the number of microorganisms contained in the water. By contrast, the container (1) according to the invention showed a reduction by one order of magnitude even after one day. After 14 days, the number of microorganisms contained in the water was already effectively reduced to below the detection limit due to storage in the container (1) according to the invention. This effect also continued during the further course of the experiment (22 days).

The experiment was subsequently repeated with the container (1) according to the invention shown in FIG. 2; the results of this experiment can be found in FIG. 5b. In contrast with the aforementioned experiment, the same quantity (180 g) of the antimicrobial composition (13) was used, but it was present as a granulate (15) which was introduced into the interior of the container (1) by means of a partial volume or a cage (16).

Figure 5B:
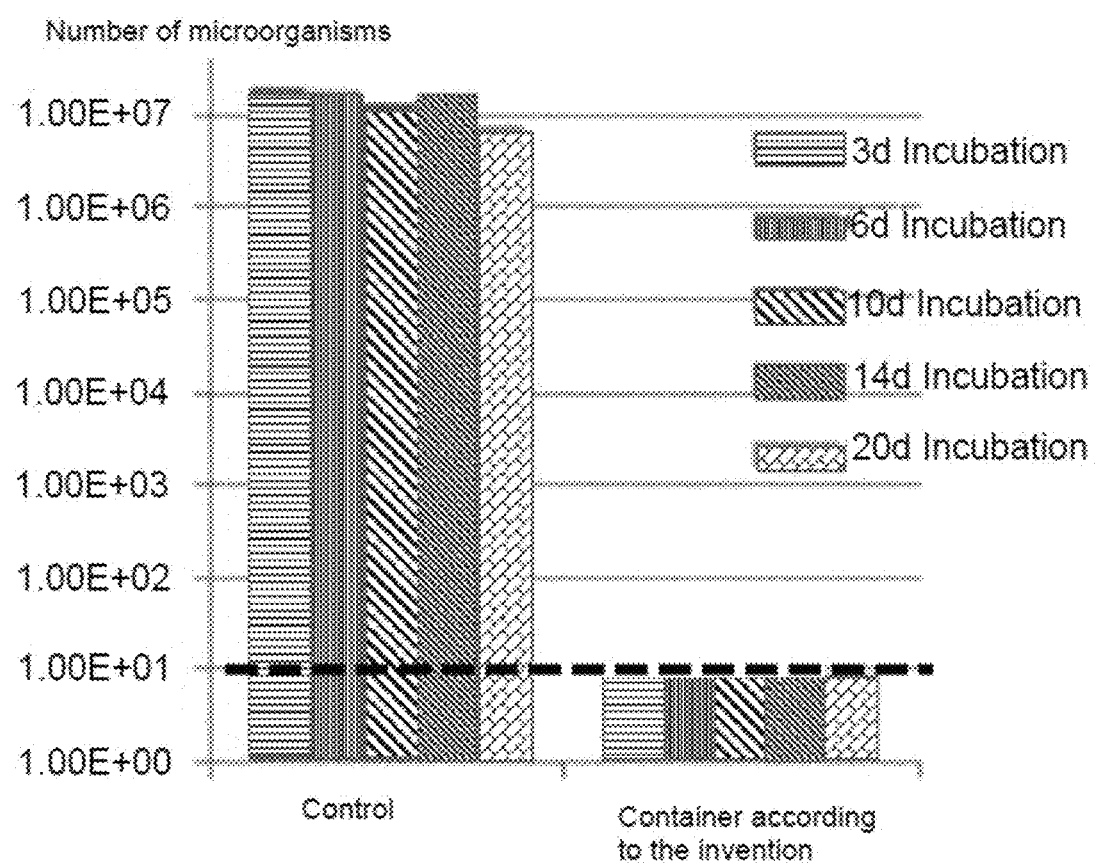

As can be seen in FIG. 5b, no difference to the experiment shown in FIG. 5a was detected with regard to the control container. However, by contrast, a reduction in the number of microorganisms contained in the water to below the detection limit was already achieved after three days of incubation. As can also be seen in FIG. 5b, this effect also continued for the remaining incubation period.

In summary, the experiments impressively demonstrate the reliable and long-lasting efficacy of the antimicrobial composition (1) according to the invention.

FIGS. 6 to 9 show embodiments in which the antimicrobial composition (13) is present in the form of a granulate (15) and arranged in a partial volume (16), wherein the partial volume (16) is reversibly connected to the container (1) by means of a fastening device and arranged in the interior (8) of the container, and wherein a closeable opening (24) in the container wall (2, 3, 5, 6, 7, 9) is a component of said fastening device.

FIG. 6A shows a schematic section through the container (1) according to the invention, in which a closeable opening (24) of the container is used for fastening a partial volume (16) which contains antimicrobial granulate (not depicted) arranged in its interior.

As can be seen, the container (1) consists of an upper container shell (2) and a lower container shell (3), which are interconnected at a weld seam (4).

A closeable opening (24) is arranged in the container top (7). The container (1) can have further openings, in particular e.g., service openings. The closeable opening (24) has both an inward protrusion (26) of the container wall into the interior (8) of the container and an outward protrusion (27) of the container wall in the direction of the environment of the container. The closeable opening (24) and the outward protrusion (27) and the inward protrusion (26) form a channel through the container wall (9). In this case, the clear width of the inward protrusion (26) and the outward protrusion (27) decreases in the direction of the interior of the container (8). Correspondingly, the diameter of the channel through the container wall (9) decreases in the direction of the interior of the container (8).

The closeable opening (24) is a component of a fastening device, by means of which the partial volume (16) can be reversibly fastened to the container (1) and arranged in the interior of the container (8).

From the outside, i.e., from the environment of the container (1), a closure (32) inserted into the closeable opening (24) can be seen. The closure (32) closes the closeable opening (24) in a fluid-tight manner. On its outer wall, the closure (32) has a plurality of connection means (31) via which it indirectly contacts the closeable opening (24). Between the outer wall of the closure and the closeable opening (24), a rubber sleeve (33) is arranged which ensures a secure connection of the closure (32) in the closeable opening (24). This secure fit is further strengthened by the above-described decrease of the diameter of the channel through the container wall (9) in the direction of the interior of the container (8). The rubber sleeve (33) was also inserted into the closeable opening (24) from the outside.

A partial volume (16), which is designed as a substantially cylindrical cage and has a lattice area (28), is also shown. The granulate (not depicted) consisting of the antimicrobial composition is arranged within the partial volume (16). The diameters of the lattice openings are smaller than the diameters of the granulate particles, thus effectively preventing the granulate from escaping from the partial volume. The partial volume (16) was injection-molded as one piece from a plastic.

It can also be seen that the partial volume (16) has connection means (31) on its outer wall, which are arranged on the end of the partial volume (16) facing away from the lattice area (28). The partial volume (16) can be inserted into the closeable opening (14) from the interior of the container (8) and fastened there in a force-locking and/or form-locking manner. The insertion of the partial volume (16) into the closeable opening (24) is symbolized by the upward-pointing arrow shown in FIG. 6A. When the partial volume (16) is inserted into the closeable opening (24), the partial volume (16) contacts the inner wall of the closure (32) with its connection means (31) and is thus securely fastened in the closeable opening (24). Simultaneously, the antimicrobial granulate arranged in the partial volume (16) is positioned within the interior of the container (8). Service fluid located in the interior of the container (8) can thus be treated antimicrobially in an efficient manner.

FIG. 6B shows an enlargement of the area of the closeable opening (24) according to FIG. 6A. Once again, the container wall (9) or the upper container shell (2) or the container top (7), in which the closeable opening (24) is arranged, are shown. The closeable opening (24) has an inward protrusion (26) and an outward protrusion (27). Initially, a rubber sleeve (33) was inserted from the outside into said closeable opening (24). The outward protrusion (27) supports or improves the fit of the rubber sleeve (33). After the sleeve (33), the closure (32) was inserted into the closeable opening (24)—also from the outside. In this case, the inserted closure (32) indirectly, i.e., via the rubber sleeve (33), contacts the closeable opening (24) with its connection means (31) which is arranged on the outer wall of the closure. Since the clear width of the inward protrusion (26) and the outward protrusion (27) slightly decreases in the direction of the interior of the container (8), the closure (32) is held securely in the closeable opening (24) and closes said opening in a fluid-tight manner.

The partial volume (16) (not depicted) can be inserted into the closeable opening (24) from the interior of the container, for example, via a service opening, and can be fastened to said opening in a force-locking and/or form-locking manner.

FIG. 6C shows an enlargement of the area of the closeable opening (24) according to a further variant. Once again, the container wall (9) or the upper container shell (2) or the container top (7), in which the closeable opening (24) is arranged, are shown. The closeable opening (24) has an inward protrusion (26) and an outward protrusion (27). A rubber sleeve (33) was inserted from the outside into said closeable opening (24). This figure also shows that the outward protrusion (27) advantageously supports the positioning and or fixing of the rubber sleeve (33).

The closure insertable into the closeable opening (24) is not depicted.

On the inner wall of the inward protrusion (26), the closeable opening (24) has connection means (31) which can interact with the connection means (31) of the partial volume (16). For this purpose, the partial volume (16) can be inserted into the closeable opening (24) from the interior of the container (8). After inserting the partial volume (16) into the closeable opening (24), the partial volume (16) is securely fastened in a force-locking and/or form-locking manner.

Once again, the partial volume (16) is designed as a cage, wherein a lattice structure of the cage is also present but not shown in this drawing. The partial volume (16) is made of plastic and produced by means of the injection molding process. The granulate of the antimicrobial composition (not depicted) is located within the partial volume.

FIG. 6D shows an enlargement of the area of the closeable opening (24) according to a further variant. Once again, the container wall (9) or the upper container shell (2) or the container top (7), in which the closeable opening (24) is arranged, are shown. The closeable opening (24) is an air-inlet and/or ventilation opening (25) of the container (1). The closeable opening (24) has an inward protrusion (26). A closure (32), which closes the closeable opening (24), was inserted into the closeable opening (24) from the outside of the container (1).

On its outer wall (29), the closure (32) has connection means (31), via which the inward protrusion (26) of the closeable opening (24) is contacted. This ensures a secure form-locking and/or force-locking connection between the closure (32) and the closeable opening (24) or the fastening of the closure (32) in the closeable opening (24).

On its inner wall (30), the closure (32) also has connection means (31) that are suitable to interact and create a form-locking and/or force-locking connection with connection means (31) of a partial volume (16) insertable into the closeable opening (24).

The closure (32) further has a channel (38) which passes through said closure. The closure (32) is designed to be substantially cylindrical, wherein a first opening is arranged in the interior of the container (8). The opening opposite said first opening of the closure (32) is closed by a semipermeable membrane (34). As a result, gas, but no liquids, can pass through the closeable opening (24) closed by the closure (32). The closure (32) furthermore has a lid (35) which is arranged above and protects the membrane (34).

The partial volume (16), which is insertable into the closeable opening (24) and designed as a cage, again has a lattice area (28). Within said area of the partial volume (16), the granulate consisting of the antimicrobial composition is arranged but not shown in the drawing. At the end of the partial volume (16) opposite the lattice area (28), fastening means (31) are arranged on its outer wall which interact with the fastening means (31) on the inner wall (30) of the closure (32). The substantially cylindrical partial volume (16) further has an opening (39) on the same side. The side of the cylindrical partial volume (16) opposite said opening (39) is closed.

The partial volume (16) can be inserted into the closeable opening (24) from the interior of the container (8). Initially, it can also be inserted into the closure (32) and subsequently, it can be inserted together with the closure (32) into the closeable opening (24, 25) from the outside of the container and/or, together with the closure, it can be removed from the closeable opening (24, 25) and, for example, subsequently replaced. As a result, it is easier to service the container from the outside of the container.

FIG. 6E shows an enlargement of the area of the closeable opening (24) according to a further variant. Once again, the container wall (9) or the upper container shell (2) or the container top (7), in which the closeable opening (24) is arranged, are shown. The closeable opening (24) is an air-inlet and/or ventilation opening (25) of the container (1). The closeable opening (24) has an outward protrusion (27).

A rubber sleeve (33) was inserted into the closeable opening (24) and once again contacts the container wall (9) and the outward protrusion (27). The closure (32) was subsequently inserted via a press-fit into the closeable opening (24) from the outside of the container (1) and securely closes the closeable opening (24). For this purpose, connection means (31) are located on the outer wall (29) of the closure (32), which indirectly contact the closeable opening (24) via the rubber sleeve (33) arranged therein.

The closure (32) once again has a channel (38) which passes through said closure and is designed to be substantially cylindrical. A first opening of the closure (32) is arranged in the interior of the container (8). The opening opposite said first opening of the closure (32) is closed by a semipermeable membrane (34). As a result, gas, but no liquids, can pass through the closeable opening (24) closed by the closure (32). The closure (32) further has a lid (35) which is arranged above and protects the membrane (34).

On the inner wall of the closure (30), further connection means (31) are arranged which can interact with the connection means of the partial volume (not depicted).

FIG. 7A is a schematic detailed view of a variant of the closure (32) according to the invention which is insertable into the closeable opening (24). It shows the substantially cylindrical design of the closure (32), forming a channel (38) which passes through the closure (32). On one end of said channel (38), a semipermeable membrane (34) is arranged which closes the opening of said channel (38). The opposite opening of the channel (38) remains open.

Also shown are connection means (31) which are arranged on the outer wall of the closure (29) and which are suitable for creating a force-locking and/or form-locking connection with the closeable opening (24) when the closure (32) is inserted into said opening (24). Furthermore, the closure (32) can have connection means (31) (not depicted in the figure) which are arranged on the inner wall (30) of the closure and which are suitable for creating a force-locking and/or form-locking connection with the partial volume insertable into the opening (24) or with connection means arranged on said partial volume.

The closure (32) furthermore has a lid (35) which is arranged above and protects the semipermeable membrane (34). For this purpose, the lid has connection means (37) which securely, but reversibly, fasten the lid (35) in the manner of a clip connection when the lid (35) is placed onto the closure (32).

FIG. 7B is a schematic detailed view of the lid (35) which is suitable for being placed onto the closure (32). Once again, the connection means of the lid (37) are shown which allow for a form-locking and force-locking connection of the lid (35) to the closure (32). The drawing also shows a connection for a hose (36), which is arranged on the lid (35) in the manner of a nipple. In particular, an air-inlet and/or ventilation hose is connected to said hose connection (36), making it possible to increase, for example, the fording depth of a motor vehicle in which the container according to the invention has been installed.

Both the closure (32) and the lid (35) are made of plastic by means of the injection molding process.

FIG. 8A is a schematic depiction of a partial volume (16) in the form of a textile net (20) inserted from the outside into, and fastened to, the closeable opening (24) which is arranged in the container bottom (6) of the container (1) according to the invention.

The drawing shows the container wall (9) or the lower container shell (3) or the part of the container bottom (6) in which a closeable opening (24) is arranged. The closeable opening (24) has an outward protrusion (27). At first, a rubber sleeve (33) was inserted into the closeable opening (24). Subsequently, the partial volume (16) designed as a textile net (20), which contains the granulate (not depicted) consisting of the antimicrobial composition, was inserted from the outside of the container (1) into the closeable opening of the container (24).

The partial volume (16) is connected to a closure (32) such that the partial volume (16), together with the closure (32) connected thereto, was inserted from the outside of the container into the closeable opening of the container (24). After insertion, the closure (32) is arranged substantially outside the container (1) and closes the closeable opening (24) while the partial volume (16, 20) and thus the granulate consisting of the antimicrobial composition is arranged in the interior of the container (8). The openings in the textile net (20) allow for the service fluid located in the container (1) to flow through them, while the granulate consisting of the antimicrobial composition is effectively retained within the interior of the textile net (20).

On the outer wall of the closure (29), connection means (31) are located which, when inserted into the closeable opening (24), allow for a fastening of the closure (32) and thus the partial volume (16) via a press fit with the rubber sleeve (33).

For maintenance purposes, the reversible connection/fastening can be detached in a simple manner and the partial volume (16, 20), together with the closure (32), can be removed from the container in order to replace, for example, the depleted antimicrobial composition. Since the closeable opening (24) is arranged on the container underside (6), said maintenance can advantageously also be performed without removing the container (1) from a motor vehicle.

FIG. 8B is a schematic depiction of a partial volume (16) in the form of a cylindrical cage with a lattice structure (28), which volume is inserted from the outside into, and fastened to, the closeable opening (24) which is arranged in the container bottom (6) of the container (1) according to the invention.

The drawing shows the container wall (9) or the lower container shell (3) or the part of the container bottom (6) in which a closeable opening (24) is arranged. The closeable opening (24) has an outward protrusion (27). At first, a rubber sleeve (33) was inserted into the closeable opening (24). Subsequently, the partial volume (16), which contains the granulate (not depicted) consisting of the antimicrobial composition, was inserted from the outside of the container (1) into the closeable opening of the container (24).

The partial volume (16) is produced to be integral with a closure (32) such that the partial volume (16), together with the closure (32) connected thereto, was inserted from the outside of the container into the closeable opening of the container (24). After insertion, the closure (32) is arranged substantially outside the container (1) and closes the closeable opening (24) while the partial volume (16) and thus the granulate consisting of the antimicrobial composition is arranged in the interior of the container (8). The openings in the lattice area (28) of the partial volume (16) allow for the service fluid located in the container (1) to flow through, while the granulate consisting of the antimicrobial composition is effectively retained.

On the outer wall of the closure, connection means (31) are located which, when inserted into the closeable opening (24), allow for a fastening of the closure (32) and thus the partial volume (16) via a press fit with the rubber sleeve (33).

For maintenance purposes, the reversible connection/fastening can be detached in a simple manner and the partial volume (16) can be removed from the container in order to replace, for example, the depleted antimicrobial composition. Since the closeable opening (24) is arranged on the container underside (6), said maintenance can advantageously also be performed without removing the container (1) from a motor vehicle.

FIG. 9 is a schematic depiction of a partial volume (16) screwed from the outside of the container (1) into the container wall (9), in particular the lower container shell (3) or the container bottom (6).

The container bottom (6) once again has a closeable opening (24) which in turn has an outward protrusion (27). Along the channel, which is formed by the opening (24) and the outward protrusion (27), through the container wall (9), a thread is arranged as a connection means (31).

The partial volume (16) is produced to be integral with a closure (32) such that the partial volume (16), together with the closure (32) connected thereto, was inserted from the outside of the container into the closeable opening of the container (24). After insertion, the closure (32) is arranged substantially outside the container (1) and closes the closeable opening (24) while the partial volume (16) and thus the granulate consisting of the antimicrobial composition is arranged in the interior of the container (8). The openings in the lattice area (28) of the partial volume (16) allow for the service fluid located in the container (1) to flow through, while the granulate (15) consisting of the antimicrobial composition (13) is effectively retained in the interior of the partial volume (16).

The connection means (31) arranged on the outer wall of the closure are also designed as a thread, and they interact with the thread of the closeable opening (24) and ensure a fluid-tight closure of the closeable opening (24).

FIG. 9B is a top view of the front side (40) of the closure (32) of the partial volume (16) and a hexagon socket profile arranged therein.

For maintenance purposes, the reversible connection/fastening can be detached in a simple manner by unscrewing and the partial volume (16) can be removed from the container in order to replace, for example, the depleted antimicrobial composition. Since the closeable opening (24) is arranged on the container underside (6), said maintenance can advantageously also be performed without removing the container (1) from a motor vehicle.

LIST OF REFERENCE SIGNS

1 Container; service fluids container
2 Upper container shell
3 Lower container shell
4 Weld seam
5 Sidewall of the container
6 Container bottom; container underside
7 Container top; container upper side
8 Interior of the container
9 Container wall; peripheral wall of the container
10 Filling device; filler neck
11 Removal device; hose
12 Water or aqueous solution; service fluid; aqueous cleaning solution
13 Antimicrobial composition
14 Installation part; plate, baffle element; perforated baffle plate
15 Granulate consisting of the antimicrobial composition
16 Partial volume; installation part; cage; net; cage consisting of the antimicrobial composition
17 Detachable connection device; dovetail with snap-in lug
18 Opening; inspection flap
19 Coextruded layer on the inner surface of the container wall
20 Net; plastic net, textile net; filled with antimicrobial granulate
21 Side surfaces; perforated side surfaces
22 Living hinge
23 Connection device; clip connection
24 Closeable opening in the wall of the container
25 Air-inlet and/or ventilation opening
26 Inward protrusion; inward protrusion of the container wall
27 Outward protrusion; outward protrusion of the container wall
28 Lattice area of the partial volume
29 Outer wall of the closure
30 Inner wall of the closure
31 Connection means; thread; means for a screw connection, means for an interference-fit connection, means for a press-fit connection, means for a bayonet connection, means for a clip connection
32 Closure
33 Sleeve; rubber sleeve
34 Semipermeable membrane
35 Lid
36 Connection for a hose; nipple
37 Connection means of the lid; clip connection
38 Channel through the closure
39 Opening in the partial volume; opening in the cage; opening in the net
40 Front side of the closure of the partial volume

The invention claimed is:

1. A container for antimicrobial storage of water or aqueous solutions comprising an antimicrobial mixture arranged in an interior of the container and the antimicrobial mixture comprises a hydrophilic polymer and a complex compound of a metal salt with an organic ligand,
wherein the complex compound is embedded in a matrix consisting of the hydrophilic polymer.

2. The container according to claim 1, wherein a proportion of the complex compound in the antimicrobial mixture lies in a range from ≥7 wt. % and ≤15 wt. %, or in a range from >10 wt. % and ≤13 wt. %.

3. The container according to claim 1, wherein a proportion of the metal salt in the antimicrobial mixture is ≥0.6 wt. %, or is ≥1.0 wt. %.

4. The container according to claim 1, wherein a ratio of a surface area of the antimicrobial mixture arranged in the interior of the container to a volume of the interior of the container is ≥0.06.

5. The container according to claim 1, wherein the antimicrobial mixture is at least partly arranged as a layer on an inner surface of a wall of the container and/or on an installation part arranged in the interior of the container.

6. The container according to claim 1, wherein the antimicrobial mixture is formed as a plate or a cage, and is a non-bearing installation part of the container.

7. The container according to claim 1, wherein the antimicrobial mixture is present in a form of a granulate.

8. The container according to claim 1, wherein the antimicrobial mixture is arranged within a partial volume of the container, which is fluidically connected to the interior of the container.

9. The container according to claim 8, wherein the antimicrobial mixture is present in a form of a granulate,
wherein the partial volume is reversibly fastened to the container by means of a fastening device and arranged in the interior of the container, and
wherein a closeable opening in a wall of the container is a component of the fastening device.

10. The container according to claim 9, wherein the closeable opening in the wall of the container has an inward protrusion into the interior of the container and/or an outward protrusion.

11. The container according to claim 10, wherein a clear width of the inward protrusion and/or the outward protrusion decreases in a direction of the interior of the container.

12. The container according to claim 9, wherein the container has a closure which is insertable from outside of the container into the closeable opening of the container, and
wherein the partial volume is insertable from the interior of the container into the closeable opening.

13. The container according to claim 12, wherein the closure is inserted into and fastened in a force-locking and/or form-locking manner to the closeable opening, and
wherein the partial volume is inserted into and fastened in the force-locking and/or form-locking manner to the closeable opening.

14. The container according to claim 13, wherein the force-locking and/or form-locking manner is carried out by a connection, and
wherein said connection is a thread, a screw connection, an interference-fit connection, a press-fit connection, a bayonet connection, or a clip connection.

15. The container according to claim 12, wherein the closure has a valve and/or a semipermeable membrane.

16. The container according to claim 12, wherein the closure has a hose connection.

17. The container according to claim 9, wherein the partial volume or a partial volume connectable to a closure is insertable from outside of the container into the closeable opening of the container, whereby the closeable opening is closed.

18. The container according to claim 17, wherein the partial volume or the partial volume connectable to the closure is inserted into and fastened in a force-locking and/or form-locking manner to the closeable opening, whereby the closeable opening is closed.

19. The container according to claim 9, wherein the closeable opening is an air-inlet and/or ventilation opening of the container.

20. The container according to claim 1, wherein the antimicrobial mixture is arranged, at least in part, in a bottom area of the container.

21. The container according to claim 1, wherein the antimicrobial mixture is connected to a wall of the container or rests on a bottom of the container.

22. The container according to claim 1, wherein the hydrophilic polymer is a polyacrylate or a polyamide selected from the group consisting of polyamide 6, polyamide 6.6, polyamide 6.10, polyamide 11, polyamide 12, and copolyamide 6/66.

23. The container according to claim 1, wherein the organic ligand is selected from the group consisting of a 2-oxazoline derivative of an organic carboxylic acid, polyethyleneimine, and polyester polyol.

24. The container according to claim 23, wherein the organic ligand is one of the polyethyleneimine or the polyester polyol and is amphiphilically modified by an n-alkane carboxylic acid.

25. The container according to claim 1, wherein a metal ion of the metal salt is an ion of a metal selected from the group consisting of Ag, Co, Cu, Mn, Mo, Os, Sn, Ti, and Zn.

26. The container according to claim 1, wherein the antimicrobial storage leads to a reduction in a number of microorganisms contained in the water or the aqueous solution by at least 50%.

27. A method for antimicrobial storage of water or aqueous solutions using the container according to claim 1, the method comprising placing the aqueous solutions or the water into the container.

* * * * *